United States Patent
Nalci et al.

(10) Patent No.: US 12,363,331 B2
(45) Date of Patent: Jul. 15, 2025

(54) ENCODING AND DECODING VIDEO CONTENT USING PREDICTION-AWARE FLEXIBLE SKIP CODING

(71) Applicant: Apple Inc., Cupertino, CA (US)

(72) Inventors: Alican Nalci, La Jolla, CA (US); Alexandros Tourapis, Los Gatos, CA (US); Hilmi Enes Egilmez, San Jose, CA (US); Hsi-Jung Wu, San Jose, CA (US); Jun Xin, San Jose, CA (US); Yeqing Wu, Milpitas, CA (US); Yixin Du, Santa Clara, CA (US); Yunfei Zheng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 18/076,166

(22) Filed: Dec. 6, 2022

(65) Prior Publication Data

US 2023/0188738 A1 Jun. 15, 2023

Related U.S. Application Data

(60) Provisional application No. 63/287,966, filed on Dec. 9, 2021.

(51) Int. Cl.
*H04N 19/44* (2014.01)
*H04N 19/184* (2014.01)

(52) U.S. Cl.
CPC ........... *H04N 19/44* (2014.11); *H04N 19/184* (2014.11)

(58) Field of Classification Search
CPC .. H04N 19/174; H04N 19/176; H04N 19/184; H04N 19/44; H04N 19/70
See application file for complete search history.

(56) References Cited

U.S. PATENT DOCUMENTS

| 11,159,812 | B2 * | 10/2021 | Lee | H04N 19/463 |
| 11,496,385 | B2 * | 11/2022 | Seregin | H04N 19/186 |
| 11,743,506 | B1 * | 8/2023 | Deng | H04N 19/70 |
| | | | | 375/240.12 |
| 2009/0097548 | A1 * | 4/2009 | Karczewicz | H04N 19/33 |
| | | | | 375/240.03 |
| 2012/0121012 | A1 * | 5/2012 | Shiodera | H04N 19/60 |
| | | | | 375/240.03 |

(Continued)

OTHER PUBLICATIONS

Nalci et al., "Non-CE6: LFNST Signaling at the UT Level," Joint Video Experts Team (JVET) ITU-T SG 16 WP3 and ISO/IEC JTC 1/SC 29/WG 11, JVET-00569-v3, 15th meeting, Gothenburg, Sweden, Jul. 3-12, 2019, 7 pages.

(Continued)

*Primary Examiner* — Peter D Le
(74) *Attorney, Agent, or Firm* — Fish & Richardson P.C.

(57) ABSTRACT

In an example method, a decoder obtains a data stream representing video content. The video content is partitioned into one or more logical units, and each of the logical units is partitioned into one or more respective logical sub-units. The decoder determines that the data stream includes first data indicating that a first logical unit has been encoded according to a flexible skip coding scheme. In response, the decoder determines a first set of decoding parameters based on the first data, and decodes each of the logical sub-units of the first logical unit according to the first set of decoding parameters.

27 Claims, 13 Drawing Sheets

(56) References Cited

U.S. PATENT DOCUMENTS

| | | | | |
|---|---|---|---|---|
| 2012/0163471 A1* | 6/2012 | Karczewicz | ......... | H04N 19/159 |
| | | | | 375/240.23 |
| 2012/0230420 A1* | 9/2012 | Sole Rojals | ........... | H04N 19/91 |
| | | | | 375/240.18 |
| 2013/0051459 A1* | 2/2013 | Kirchhoffer | ........... | H04N 19/70 |
| | | | | 375/240.07 |
| 2014/0016698 A1* | 1/2014 | Joshi | ...................... | H04N 19/14 |
| | | | | 375/240.12 |
| 2014/0254661 A1* | 9/2014 | Saxena | ................ | H04N 19/625 |
| | | | | 375/240.2 |
| 2014/0348247 A1* | 11/2014 | Tsukuba | ................. | H04N 19/60 |
| | | | | 375/240.26 |
| 2020/0413100 A1* | 12/2020 | Hsiang | ................. | H04N 19/105 |
| 2021/0076070 A1* | 3/2021 | Jung | ...................... | H04N 19/70 |
| 2021/0112279 A1* | 4/2021 | Karczewicz | ............ | H04N 19/46 |
| 2022/0400286 A1* | 12/2022 | Koo | ....................... | H04N 19/61 |

OTHER PUBLICATIONS

Zhao et al., "Proposed text for MTS related HLS (harmonization of JVET-P0495, JVET-P0501 and JVET-P0569)," Joint Video Experts Team (JVET) ITU-T SG 16 WP3 and ISO/IEC JTC 1/SC 29/WG 11, JVET-P1031-v2, 16th meeting, Geneva, Switzerland, Oct. 1-11, 2019, 7 pages.

* cited by examiner

16x16 Coding Block
fsc_flag=1

| 8x8 TU Inference TX_TYPE=IDTX | 8x8 TU Inference TX_TYPE=IDTX |
| 8x8 TU Inference TX_TYPE=IDTX | 8x8 TU Inference TX_TYPE=IDTX |

ENCODING AND DECODING VIDEO CONTENT USING PREDICTION-AWARE FLEXIBLE SKIP CODING

CROSS-REFERENCE TO RELATED APPLICATION

This application claims priority to U.S. Provisional Patent Application No. 63/287,966, filed Dec. 9, 2021, the entire contents of which are incorporated herein by reference.

TECHNICAL FIELD

This disclosure relates generally to encoding and decoding video content.

BACKGROUND

Computer systems can be used to encode and decode video content. As an example, a first computer system can obtain video content, encode the video content in a compressed data format, and provide the encoded data to a second computer system. The second computer system can decode the encoded data, and generate a visual representation of the video content based on the decoded data.

SUMMARY

In an aspect, a method includes: obtaining, by a decoder, a data stream representing video content, where the video content is partitioned into one or more logical units, and where each of the logical units is partitioned into one or more respective logical sub-units; determining, by the decoder, that the data stream includes first data indicating that a first logical unit has been encoded according to a flexible skip coding scheme; and responsive to determining that the data stream comprises the first data: determining a first set of decoding parameters based on the first data, and decoding each of the logical sub-units of the first logical unit according to the first set of decoding parameters.

Implementations of this aspect can include one or more of the following features.

In some implementations, the method can further include: determining, by the decoder, that the data stream includes a second data indicating that a plurality of second logical units has been encoded according to the flexible skip coding scheme; and responsive to determining that the data stream includes the second data: determining a second set of decoding parameters based on the second data, and decoding each of the logical sub-units of the second logical unit according to the second set of decoding parameters.

In some implementations, each of the one or more logical units can be one or more of: a coding block of the video content, a macroblock of the video content a prediction unit of the video content, a coding-tree-unit of the video content, a super-block of the video content, a slice of the video content, a tile of the video content, a segment of the video content, or a picture of the video content.

In some implementations, each of the one or more logical sub-units can be a transform unit of the video content.

In some implementations, the first data can indicate that one or more specified color components of the first logical unit have been encoded according to the flexible skip coding scheme. Decoding each of the logical sub-units of the first logical unit according to the first set of decoding parameters can include decoding the one or more specified color components of the logical sub-units of the first logical unit according to the first set of decoding parameters.

In some implementations, the one or more specified color components can include at least one of: a luma component, or a chroma component.

In some implementations, the first set of parameters can include at least one of: a common transform type associated with each of the logical sub-units of the first logical unit, a common transform coefficient scan order type associated with each of the logical sub-units of the first logical unit, a common transform coefficient scan direction associated with each of the logical sub-units of the first logical unit, a common transform coefficient coding context scheme associated with each of the logical sub-units of the first logical unit, or a common transform size associated with each of the logical sub-units of the first logical unit.

In some implementations, the common transform type can be one or more of: an identity transform type, a discrete cosine transform type, or an asymmetric discrete sine transform type, or a learned transform type.

In some implementations, the common transform coefficient scan order type can correspond to a forward transform coefficient scan order for encoding level information regarding one or more transform coefficients.

In some implementations, the common transform coefficient scan direction can be one of: a forward up-right diagonal scan, a forward down-right diagonal scan, a forward zig-zag scan direction, a forward diagonal scan direction, a forward horizontal scan direction, or a forward vertical scan direction.

In some implementations, the common transform coefficient scan order type can correspond to a reverse transform coefficient scan order for encoding sign information regarding one or more transform coefficients.

In some implementations, each of the logical sub-units can include a plurality of regions, each region having a respective index value and a respective level value. According to the common transform coefficient coding context scheme, a transform coefficient coding context for a particular region can be determined by: identifying one or more other regions of the logical sub-unit having an index value less than an index value of that region, and determining the level values of each of the identified one or more other regions.

In some implementations, according to the common transform coefficient coding context scheme, the transform coefficient coding context for a particular region can be further determined by: determining a sum of the level values of each of the identified one or more other regions, and selecting, based on the sum, the transform coefficient coding context for that region.

In some implementations, each of the logical sub-units can include a plurality of regions arranged according to a two-dimensional grid, each region having a respective level value. According to the common transform coefficient coding context scheme, a transform coefficient coding context for a particular region can be determined by: identifying one or more other regions of the logical sub-unit neighboring that region in the two-dimensional grid, and determining a sign of the level value of each of the identified one or more other regions.

In some implementations, according to the common transform coefficient coding context scheme, the transform coefficient coding context for a particular region can be further determined by: selecting, based on the signs, the transform coefficient coding context for that region.

In some implementations, identifying the one or more other regions of the logical sub-unit neighboring that region in the two-dimensional grid can include: identifying a first region to a right of that region in the two-dimensional grid, and identifying a second region below that region in the two-dimensional grid.

In some implementations, each of the logical sub-units can include a plurality of regions arranged according to a two-dimensional grid, each region having a respective level value. According to the common transform coefficient coding context scheme, a transform coefficient coding context for a particular region can be determined by: identifying one or more other regions of the logical sub-unit neighboring that region in the two-dimensional grid, and determining the level value of each of the identified one or more other regions.

In some implementations, according to the common transform coefficient coding context scheme, the transform coefficient coding context for a particular region can be further determined by: selecting, based on the signs, the transform coefficient coding context for that region.

In some implementations, identifying the one or more other regions of the logical sub-unit neighboring that region in the two-dimensional grid can include: identifying a first region above that region in the two-dimensional grid, and identifying a second region to a left of that region in the two-dimensional grid.

In some implementations, the first set of parameters can include at least one of: a common intra-prediction mode associated with each of the logical sub-units of the first logical unit, a common inter-prediction mode associated with each of the logical sub-units of the first logical unit, or a common logical sub-unit size associated with each of the logical sub-units of the first logical unit.

In some implementations, the first set of parameters can specify that each of the logical sub-units of the first logical unit be decoded according to: a Multiple Reference Line (MRL) prediction, a Palette Mode, a secondary transform, a Filter Intra Mode, an Offset Based Refinement Intra Prediction (ORIP), or a Parity Hiding mode.

In some implementations, the secondary transform can be a Low-Frequency Non-Separable Transform.

In some implementations, the first set of parameters can include: an angle delta value associated with each of the logical sub-units of the first logical unit.

In some implementations, the first set of parameters can specify that the data stream does not include last transform coefficient position signaling for any of the logical sub-units of the first logical unit.

In some implementations, the method can further include: determining that the data stream includes an indication of a first non-zero coefficient of one of the logical sub-units; and responsive to determining that the data stream includes the indication of the first non-zero coefficient of one of the logical sub-units: refraining from decoding coefficients of that logical sub-unit prior to the first non-zero coefficient, and sequentially decoding coefficients of that logical sub-unit beginning with the first non-zero coefficient.

In some implementations, the indication of the first non-zero coefficient of one of the logical sub-units can include a beginning of block syntax, where the beginning of block syntax is positioned prior to the coefficients of that logical sub-unit in the bitstream.

In another aspect, a method includes: obtaining, by a decoder, a data stream representing video content, where the video content is partitioned into one or more logical units, and where each of the logical units is partitioned into one or more respective logical sub-units; determining, by the decoder, that the data stream includes: an inter coding block and/or an intra block copy block, and an indication of a transform type associated with the inter coding block and/or the intra block copy block, where the transform type is one of: an identity transform type, a discrete cosine transform type, or an asymmetric discrete sine transform type, and responsive to determining that the data stream includes (i) the inter coding block and/or the intra block copy block and (ii) the indication of the transform type associated with the inter coding block and/or the intra block copy block: determining a first set of decoding parameters, and decoding each of the logical sub-units of the first logical unit according to the first set of decoding parameters.

Other implementations are directed to systems, devices, and non-transitory, computer-readable media having instructions stored thereon, that when executed by one or more processors, causes the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIG. 4 is a diagram of example scan orders.

FIG. 5 is a diagram of example context derivation neighborhoods.

FIG. 6 is a diagram showing 4 example sub-transform units residing under a 16×16 coding block.

FIG. 7 is a diagram of example scan directions for level coding and predictive context regions/neighborhoods used for level coding in AV1/AVM (left) versus the FSC mode (right).

FIG. 9 is a diagram of an example of level and sign coding passes for the FSC mode.

FIG. 10 is a diagram of an example process for encoding first coefficient positions and/or beginning or block syntax.

DETAILED DESCRIPTION

Figure 1:
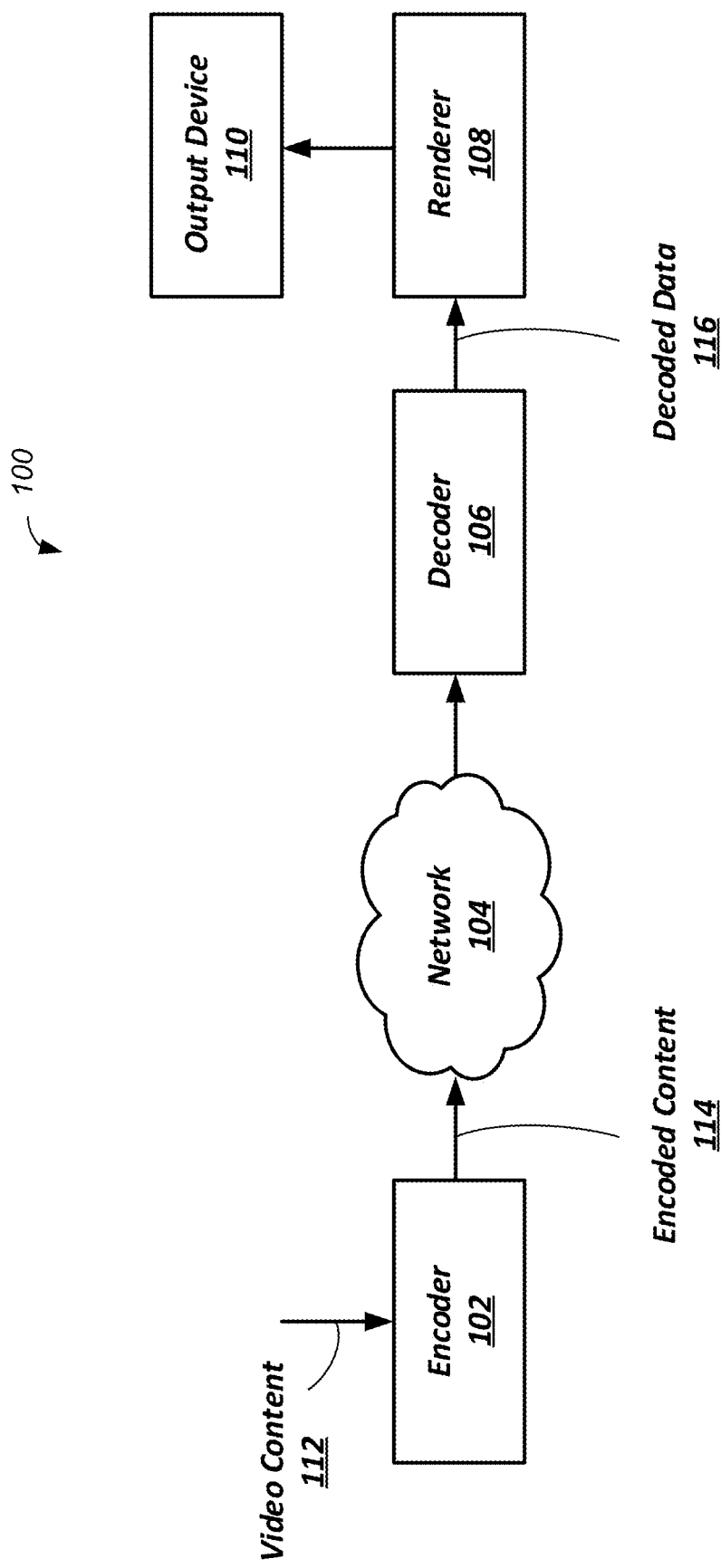
FIG. 1 is a diagram of an example system for encoding and decoding video content.

In general, computer systems can encode and decode video content. As an example, a first computer system can obtain video content (e.g., digital video including several frames or video pictures), encode the video content in a compressed data format (sometimes referred to as video compression format), and provide the encoded data to a second computer system. The second computer system can decode the encoded data (e.g., by decompressing the compressed data format to obtain a representation of the video content). Further, the second computer system can generate a visual representation of the video content based on the decoded data (e.g., by presenting the video content on a display device).

Computer systems can encode video content according to one or more parameters or settings. In some implementations, when generating encoded data, a computer system can explicitly signal the parameters or settings that were used to encode the data to other computer systems (e.g., as a part of the compressed data format), such that the other computer systems can accurately decode the encoded data and recover the video content.

However, in some implementations, computer systems can infer at least some of the parameters or settings that were used to encode the data, without relying on an explicit signaling of those parameters or settings. As an example, video content can be encoded according to a flexible skip coding (FSC) scheme, in which certain parameters or settings that are used to encode the video content are not explicitly signaled in the compressed data format. Upon receiving the compressed data format, a computer system can determine that the compressed data format was encoded according to the FSC scheme, and infer one or more parameters or settings for decoding the compressed data format in accordance with the FSC scheme. As an example, a computer systems can infer parameters such as a transform type, a transform coefficient scan order type, a common transform coefficient scan direction, a transform coefficient coding context scheme, and/or a transform size that was used to encode at least a portion of the video content. In some implementations, flexible skip coding may also be referred to as forward skip coding (e.g., referring to a forward scan direction for encoding information, such as the coefficients of one or more logical units or logical sub-units of video content).

Implementations of the techniques described herein can be used in conjunction with various video coding specifications, such as H.264 (AVC), H.265 (HEVC), H.266 (VVC), and AV1, among others.

The techniques described herein can provide various technical benefits. For example, by encoding video content according to a FSC scheme, a computer system need not explicitly signal certain parameters and/or settings in the encoded video content, thereby reducing the size and/or complexity of the encoded video content (e.g., compared to video content encoded without use of a FSC scheme). Further, a computer system need not parse encoded video content for signaling information regarding certain parameters and/or settings, thereby reducing the computational resources that are expended to decode encoded video content (e.g., compared to decoding encoded video content without use of a FSC scheme). This enables computer systems to reduce the amount of resources that are expended to encode, store, transmit, and decode video content. For instance, these techniques can reduce an expenditure of computational resources (e.g., CPU utilization), network resources (e.g., bandwidth utilization), memory resources, and/or storage resources by a computer system in encoding, storing, transmitting, and decoding video content.

FIG. 1 is a diagram of an example system 100 for processing and displaying video content. The system 100 includes an encoder 102, a network 104, a decoder 106, a renderer 108, and an output device 110.

During an example operation of the system 100, the encoder 102 receives information regarding video content 112. As an example, the video content 112 can include an electronic representation of moving visual images, such as a series of digital images that are displayed in succession. In some implementations, each of the images may be referred to as frames or video pictures.

The encoder 102 generates encoded content 114 based on the video content 112. The encoded content 114 includes information representing the characteristics of the video content 112, and enables computer systems (e.g., the system 100 or another system) to recreate the video content 112 or approximation thereof. As an example, the encoded content 114 can include one or more data streams (e.g., bit streams) that indicate the contents of each of the frames of the video content 112 and the relationship between the frames and/or portions thereof.

The encoded content 114 is provided to a decoder 106 for processing. In some implementations, the encoded content 114 can be transmitted to the decoder 106 via a network 104. The network 104 can be any communications networks through which data can be transferred and shared. For example, the network 104 can be a local area network (LAN) or a wide-area network (WAN), such as the Internet. The network 104 can be implemented using various networking interfaces, for instance wireless networking interfaces (e.g., Wi-Fi, Bluetooth, or infrared) or wired networking interfaces (e.g., Ethernet or serial connection). The network 104 also can include combinations of more than one network, and can be implemented using one or more networking interfaces.

The decoder 106 receives the encoded content 114, and extracts information regarding the video content 112 included in the encoded content 114 (e.g., in the form of decoded data 116). For example, the decoder 106 can extract information regarding the content of each of the frames of the video content 112 and the relationship between the frames and/or portions thereof.

The decoder 106 provides the decoded data 116 to the renderer 108. The renderer 108 renders content based on the decoded data 116, and presents the rendered content to a user using the output device 110. As an example, if the output device 110 is configured to present content according to two dimensions (e.g., using a flat panel display, such as a liquid crystal display or a light emitting diode display), the renderer 108 can render the content according to two dimensions and according to a particular perspective, and instruct the output device 110 to display the content accordingly. As another example, if the output device 110 is configured to present content according to three dimensions (e.g., using a holographic display or a headset), the renderer 108 can render the content according to three dimensions and according to a particular perspective, and instruct the output device 110 to display the content accordingly.

Figure 2:
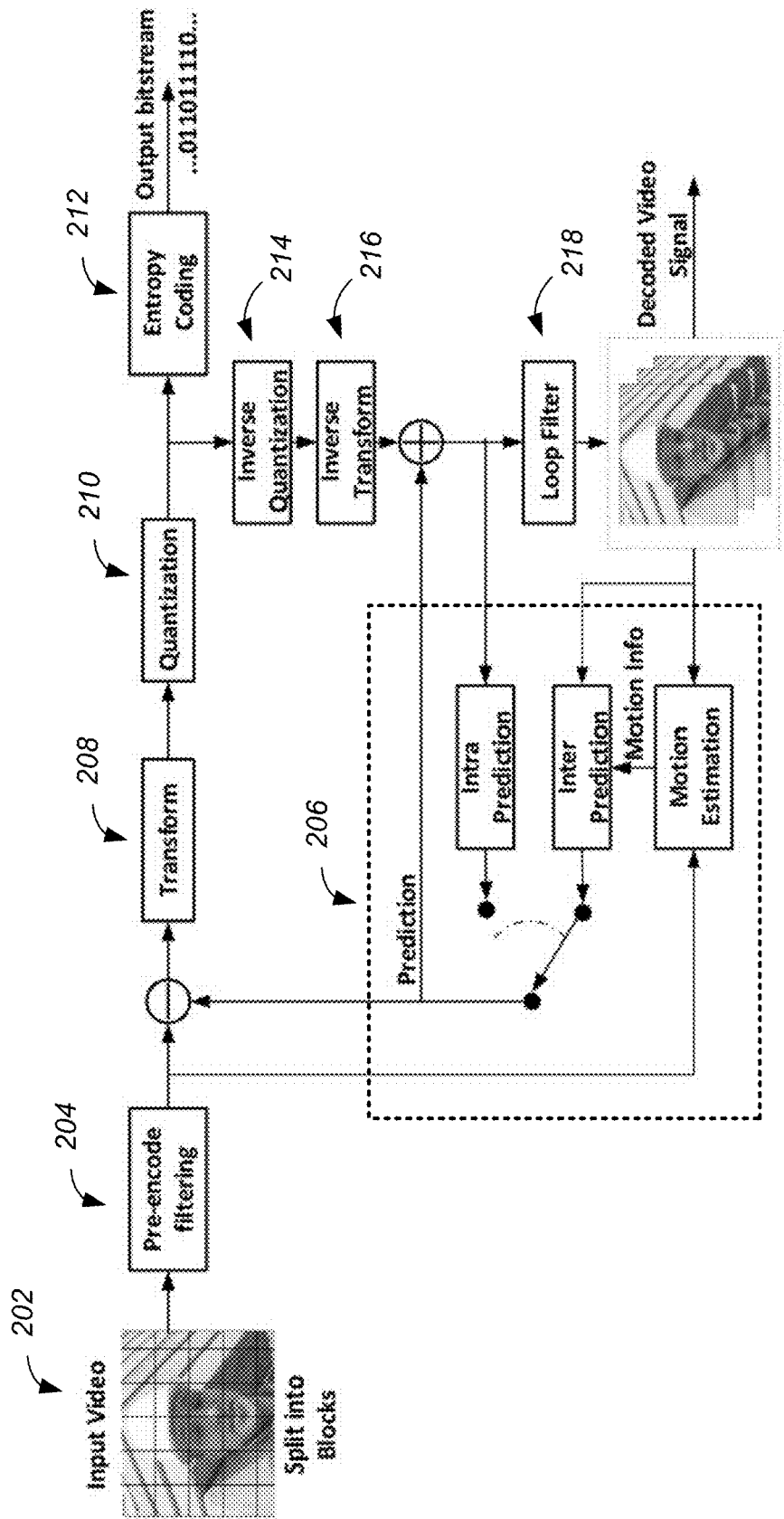
FIG. 2 is a diagram of example encoding and decoding operations.

FIG. 2 shows an example encoding and decoding operations in greater detail.

As shown in FIG. 2, an encoder 102 receives input video (e.g., the video content 112), the splits or partitions the input video into several units or blocks (block 202). As an example each frame of the video content can be partitioned into a number of smaller regions (e.g., rectangular or square regions). In some implementations, each region can be further partitioned into a number of smaller sub-regions (e.g., rectangular or square sub-regions).

The encoder 102 can filter the video content according a pre-encoding filtering stage (block 204). As examples, the pre-encoding filtering stage can be used to remove spurious information from the video content and/or remove certain spectral components of the video content (e.g., to facilitate encoding of the video content). As further examples, the pre-encoding filtering stage can be used to remove interlacing form the video content, resize the video content, change a frame rate of the video content, and/or remove noise from the video content.

In a prediction stage (block 206), the encoder 102 predicts pixel samples of a current block from neighboring blocks (e.g., by using intra prediction tools) and/or from temporally different frames/blocks (e.g., using inter prediction/motion compensated prediction), or hybrid modes that use both inter and intra prediction. In general, the prediction stage aims to reduce the spatial and/or temporally redundant information in coding blocks from neighboring samples or frames, respectively. The resulting block of information after subtracting the predicted values from the block of interest may be referred to as a residual block. The encoder 102 then applies a transformation on the residual block using variants of the discrete cosine transform (DCT), discrete sine transform (DST), or other practical transformation.

Further, in a transform stage (block 208), the encoder 102 provides energy compaction in the residual block by mapping the residual values from the pixel domain to some alternative Euclidean space. This transformation aims to generally reduce the number of bits required for the coefficients that need to be encoded in the bitstream.

The resultant coefficients are quantized using a quantizer stage (block 210), which reduces the number of bits required to represent the transform coefficients. However, quantization can also cause loss of information, particularly at low bitrate constraints. In such cases, quantization may lead to a visible distortion or loss of information in images/video. The tradeoff between the rate (e.g., the amount of bits sent over a time period) and distortion can be controlled with a quantization parameter (QP).

In the entropy coding stage (block 212), the quantized transform coefficients, which usually make up the bulk of the final output bitstream, are signaled to the decoder using lossless entropy coding methods such as multi-symbol arithmetic coding or context-adaptive binary arithmetic coding (CABAC). Further, certain encoder decisions, such as the partitioning size, intra prediction options (e.g., weighed intra prediction, multireference line modes, etc.), type of transform, and other additional tools such as a secondary transform mode, can be encoded in the bitstream to inform the decoder of the final encoding decision. This information can be considered side information, and usually accounts for a smaller portion of the final bitstream as compared to quantized transform coefficients.

The output of the entropy coding stage is provided as the encoded content 114 (e.g., in the form of an output bitstream).

In general, the decoding process is performed to reverse the effects of the encoding process. As an example, an inverse quantization stage (block 214) can be used to reverse the quantization applied by the quantization stage. Further, an inverse transform stage (block 216) can be used to reverse the transformation applied by the transform stage to obtain the frames of the original video content (or approximations thereof).

Further, restoration and loop-filters (block 218) can be used on the reconstructed frames (e.g., after decompression) to further enhance the subjective quality of reconstructed frames. This stage can include de-blocking filters to remove boundary artifacts due to partitioning, and restoration filters to remove other artifacts, such as quantization and transform artifacts.

The output of the loop filter is provided as the decoded data 116 (e.g., in the form of video content, such as a sequence of images, frames, or video pictures).

As described above, when decoding encoded video content, a computer systems can infer at least some of the parameters or settings that were used to encode the video content, without relying on an explicit signaling of those parameters or settings. As an example, video content can be encoded according to a FSC scheme, in which certain parameters or settings that are used to encode the video content are not explicitly signaled in the compressed data format. Upon receiving the compressed data format, a computer system can determine that the compressed data format was encoded according to the FSC scheme, and infer one or more parameters or settings for decoding the compressed data format in accordance with the FSC scheme.

In general, when encoding video content, a computer system can selectively activate a FSC mode, and signal use of the FSC mode (e.g., by including an appropriate flag or other signaling data in the encoded video content). Further, when decoding encoded video content, a computer system can determine that the FSC mode was used during the encoding process (e.g., by parsing the flag or other signaling data in the encoded video content), and decode the encoded video content using the FSC mode. In some implementations, use of the FSC mode can be signaled at the coding block (CB) or prediction unit (PU) level, where a coding block or prediction unit may contain multiple transform units (TUs). In some implementations, use of the FSC mode may be signaled at a higher level, such the coding-tree-unit (CTU), super-block (SB), slice, tile, frame, picture, or sequence levels.

Further, in general, the FSC mode can be used to specify the entropy coding and decoding process for all TUs residing under the same CB/PU/CTU/Slice/Tile in a video codec. Further, the FSC mode can specify alternative scan orders and/or alternative contexts models for entropy coding, such as for level and sign coding and contexts for transform block skip flags. Further, the FSC mode can be used to disable signaling of certain syntax elements in the bitstream, such as the multiple-reference line (MRL) index, offset based intra prediction refinement (ORIP) indexes, delta angle signaling, last significant coefficient coding, intra secondary transform (IST), or other transform related flags and indices, Palette mode and intra-block copy, and transform type signaling. Further, FSC relevant indices can be efficiently coded in the bitstream by using contexts defined per prediction mode, block size/block size groups, and neighboring block statistics. Further, the FSC mode can be used to provide a simpler entropy coding alternative and can simply the overall decoding process for certain coding blocks by using smaller predictive neighborhoods for context modeling (e.g., compared to encoding and decoding techniques that do not use the FSC mode).

Further example features of the FSC mode are described in detail below.

Figure 3:
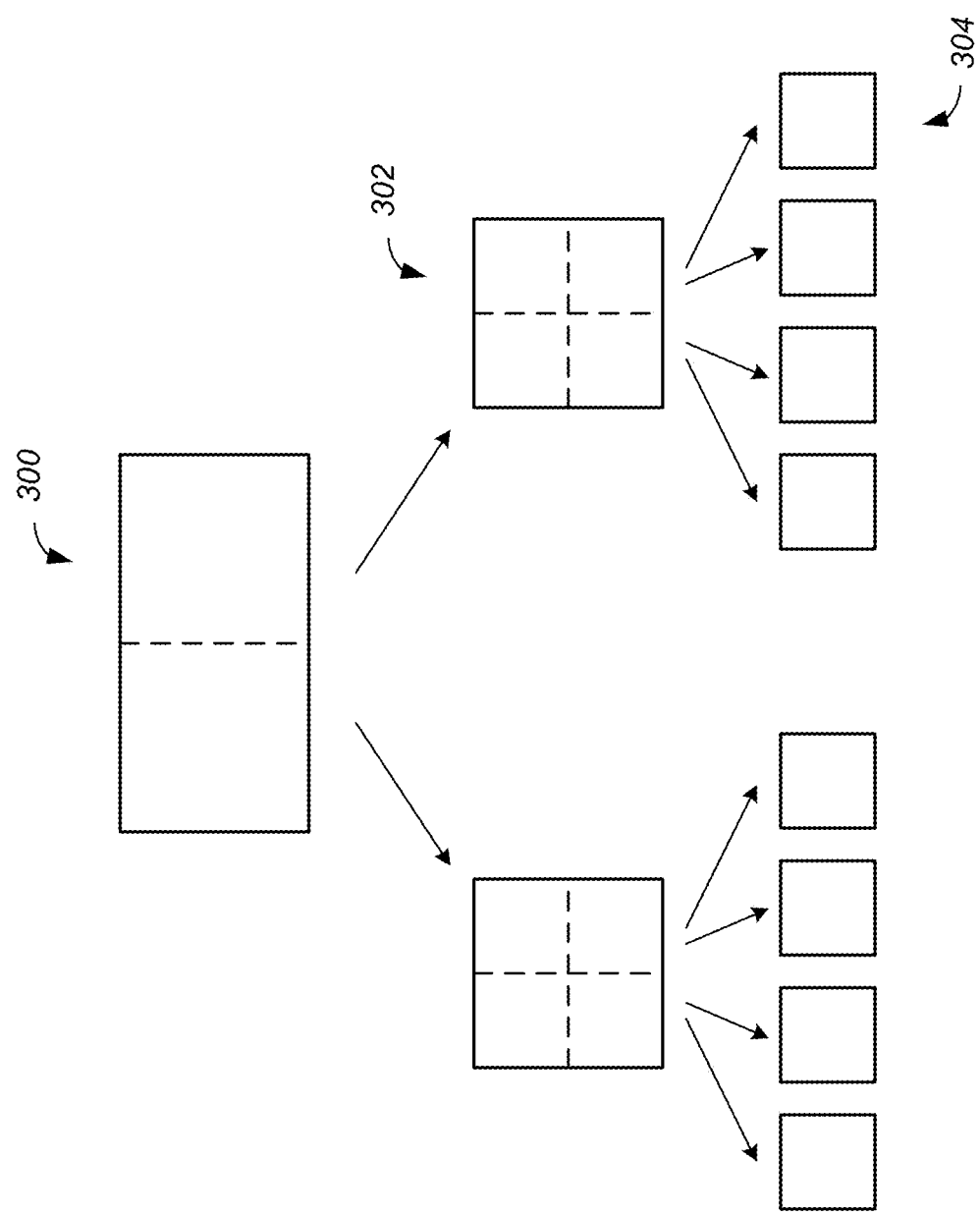
FIG. 3 is a diagram of example partitioning of logical units of video content.

In general, encoders and decoders (codecs) can process video content according to a block-based technique. For instance, during an encoding process, an encoder can partition each of several logical units of video content into several smaller respective logical sub-units. In some implementations, each of the logical sub-units can be further partitioned into small respective logical sub-sub-units (which in turn can be further partitioned one or more times). As an example, as shown in FIG. 3, a video frame 300 can be partitioned into several smaller coding-tree units (CTUs) or superblocks 302. Further, CTUs or superblocks 302 can be partitioned into smaller respective coding blocks 304 for finer processing. In some implementations, each of the coding blocks can include a particular number and arrangement of pixels of the original video frame (e.g., 4×4 pixels, or any other number or arrangement of pixels)

Further, in general, codecs can process video content according to various transformation types. As an example, transformation types can include a discrete cosine transform (DCT), an asymmetric discrete sine transform (ADST), a flipped ADST, and an Identity transform (IDTX). These transforms can be applied either in one dimension (1D) (e.g., horizontally or vertically) or in two dimensions (2D), such as both horizontally and vertically with 2D transform kernels as summarized in Table 1 below. Except for the IDTX transform, all transform types in Table 1 can apply a transform kernel along either the vertical or horizontal direction. In some implementations, a secondary transform called "intra secondary transform" (IST) can be applied as a non-separable transform kernel on top of the primary transform coefficients based on a mode decision.

TABLE 1

Example transform types.

| Transform Type | | Vertical Mode | Horizontal Mode |
|---|---|---|---|
| DCT_DCT | 2D | DCT | DCT |
| ADST_DCT | 2D | ADST | DCT |
| DCT_ADST | 2D | DCT | ADST |
| ADST_ADST | 2D | ADST | ADST |
| FLIPADST_DCT | 2D | Flipped ADST | DCT |
| DCT_FLIPADST | 2D | DCT | Flipped ADST |
| FLIPADST_FLIPADST | 2D | Flipped ADST | Flipped ADST |
| ADST_FLIPADST | 2D | ADST | Flipped ADST |
| FLIPADST_ADST | 2D | Flipped ADST | ADST |
| IDTX | 2D | Identity | Identity |
| V_DCT | 1D | DCT | Identity |
| H_DCT | 1D | Identity | DCT |
| V_ADST | 1D | ADST | Identity |
| H_ADST | 1D | Identity | ADST |
| V_FLIPADST | 1D | Flipped ADST | Identity |
| H_FLIPADST | 1D | Identity | Flipped ADST |

Regardless of the transform type selected by an encoder, the resulting coefficients from the transform stage need to be signaled to the decoder (either explicitly or implicitly), such that the decoder can accurately decode the encoded video content. In some implementations, coefficient coding can be summarized in four main parts: (i) scan order selection, (ii) coding of the last coefficient position, (iii) level and sign derivation, and (iv) context-based coefficient coding. Each of these parts are discussed in further detail below.

Figure 4:
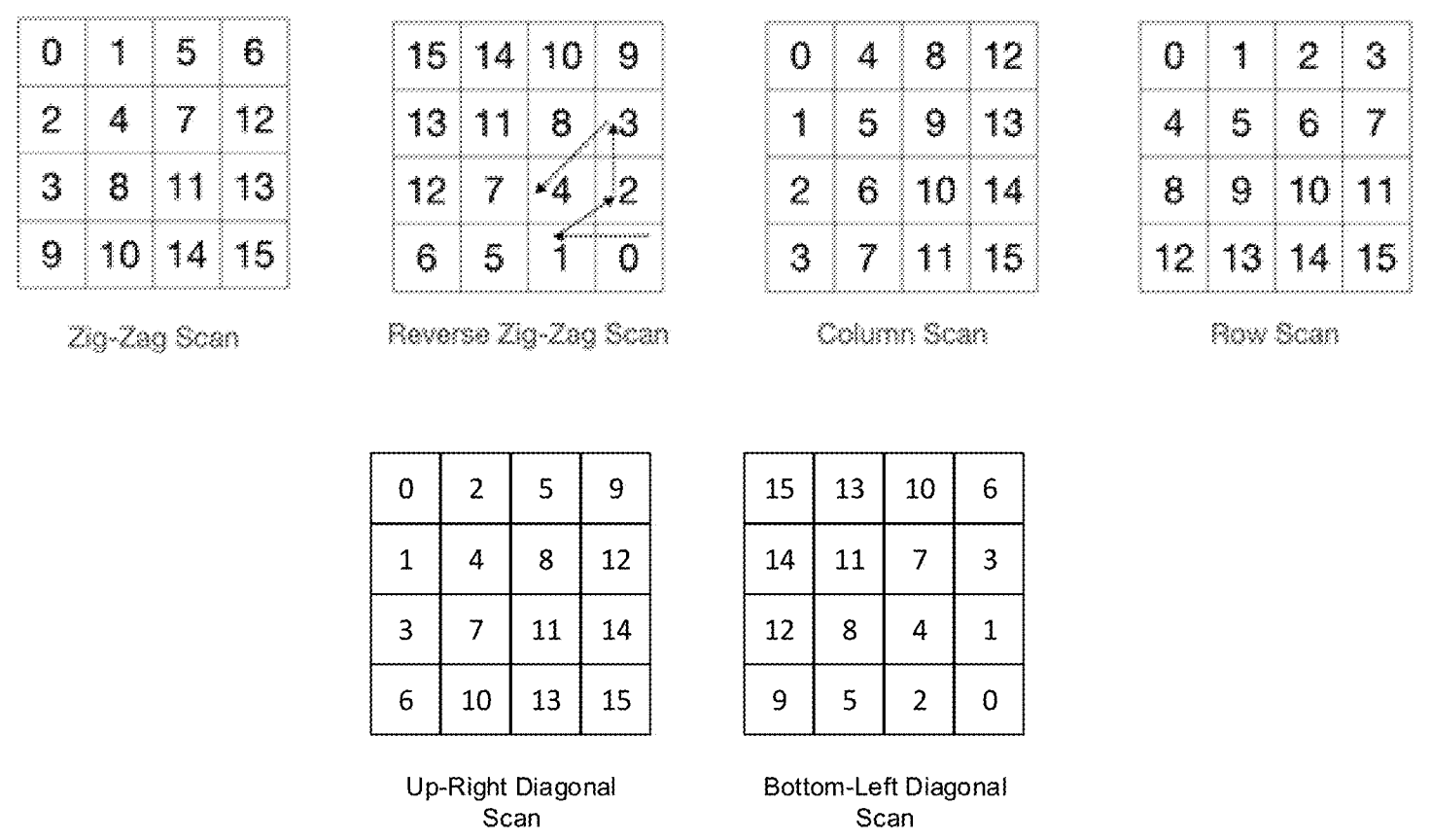

Scan order selection: In general, various scan orders can be used. As an example, as shown in FIG. 4, scan orders can include a zig-zag scan, a reverse zig-zag scan, a column scan (e.g., a vertical scan), and a row scan (e.g., a horizontal scan), as shown in FIG. 4 for a transform block size of 4×4. As another example, as also shown in FIG. 4, scan orders can include an up-right diagonal scan or a bottom-left diagonal scan. In FIG. 4, the sequence of the scan order is indicated by the index number shown in each element of the transform block.

In some implementations, an encoder or decoder can use a forward scan order (e.g., a scan order in which the elements of the transform block are scanned sequentially in ascending order of their index numbers). In these implementations, the FSC mode may be referred to as a "forward skip coding" mode. A forward scan order can be beneficial, for example, in encoding and decoding data according one or more of the level coding and predictive context determination techniques described herein.

In some implementations, an encoder or decoder can use both the forward versions and the reverse versions of these scans depending on the coding pass. For example, the reverse zig-zag scan is also shown in FIG. 4 (e.g., the second column). Further, the selected scan order can depends on the transform type used (e.g., as shown in Table 1). For example, 2D transforms such as DCT_DCT can use a zig-zag scan order to map the 2D coefficient values into a single array. This mapping can be either forward or reverse, as shown in FIG. 4. The coefficient coding traverses the coefficient in the selected scan order during the entropy coding stage.

In some implementations, the common transform coefficient scan direction can be an up-right diagonal scan, or a down-right diagonal scan. The scan direction can be a reversed version of the scans for non-common mode.

Coding of the last coefficient position: Before coding the actual coefficients per scan order index, an encoder can first determine the last position of the most significant coefficient in a transform block, or the coefficient location end-of-block (EOB). If EOB value is 0, this means that the transform unit does not have any significant coefficients and nothing needs to be coded for the current transform unit. In this case, only a skip flag can be coded that indicates whether EOB is 0 or 1.

However, if the EOB value is non-zero, then the last coefficient position can be explicitly coded. This last position determines which coefficient indices to skip during the scan order coding. To provide an example, if EOB=4 for a transform block in FIG. 4, then only coefficient indices of 0, 1, 2, 3 can be coded according to the zig-zag scan order. Other coefficient indices (e.g., indices greater than 4) as determined by the scan order are not visited during the coefficient coding stage.

Level mapping and sign derivation: If a coefficient needs to be coded, an encoder can first convert a transform coefficient into a "level" value by taking its absolute value. For 2D transforms, a reverse zig-zag scan can be used to encode the level information. This scan starts from the bottom right side of the transform unit in a coding loop (e.g., starting from the EOB index until the scan index hits 0) as in the second column of FIG. 4. The level values can be positive, and can be signaled to the decoder in multiple coding passes as follows:

Base Range (BR): This covers level values of 0, 1, 2. If a level value is less than or equal to 2, consequently the level coding loop terminates here. Coefficient coding does not visit the Low/High ranges as discussed next. The level values are context coded depending on the neighboring level values and other parameters, such as transform size, plane type, etc.

Low Range (LR): This range covers level values between [3-14]. The level values are context coded depending on the neighboring level values and other parameters such as transform size, plane type, etc.

High Range (HR): This range corresponds to level values greater than 15. The level information beyond 15 can be coded with Exp-Golomb code without using contexts.

In some implementations, a different number of covered level values can be used in each coding pass. For instance a different number of symbols and a variable number of level coding can be used, depending on the spatial region of a TU.

After the level value is coded in reverse scan order, the sign information can be coded separately using a forward scan pass over the significant coefficients. The sign flag can be bypass coded with 1 bit per coefficient without using probability models. In some implementations, bypass coding can be used to simplify entropy coding, as DCT coefficients often have random signs.

Context-based level coding: In some implementations, level information can be encoded with an appropriate selection of contexts or probability models using multi-symbol arithmetic encoding. These contexts can be selected based on various parameters such as transform size, plane (e.g., luma or chroma) information, and the sum of previously coded level values in a spatial neighborhood.

Figure 5:
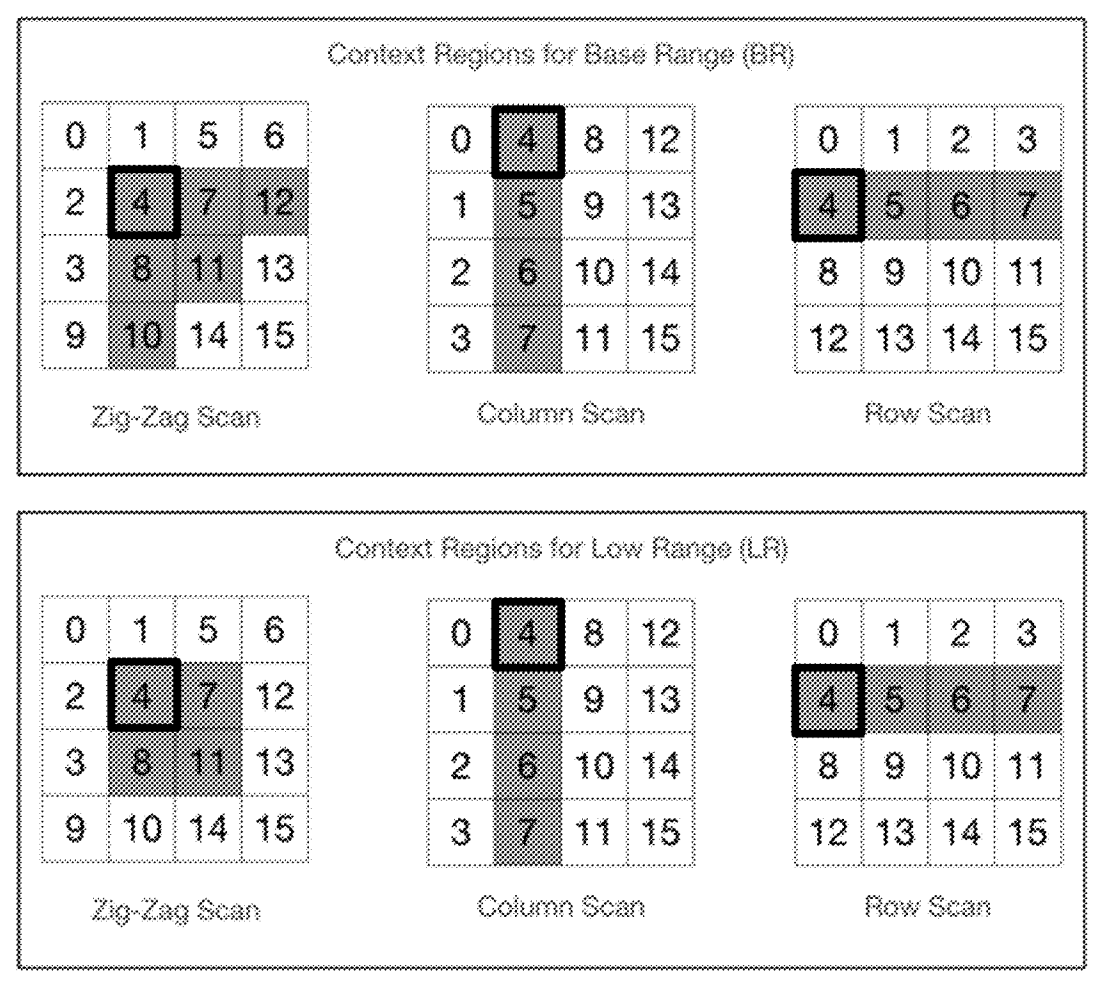

FIG. 5 shows several examples of how the contexts can be derived based on neighboring level values. For example, for base range coding with zig-zag scan, level value for scan index 4 (indicated by a bold outline) can be encoded by using the level values in the shaded, non-bolded neighboring block (having scan indices 7, 8, 10, 11, and 12). The level values in this neighborhood are summed to select an appropriate probability mode or a context index for arithmetic coding. The shaded, non-bolded blocks are already decoded since level information is decoded in reverse scan order. Likewise, 1D transforms can only access the previously decoded three neighboring samples. Low Range coding constrains the context derivation neighborhood for 2D transforms to be within a 2×2 region.

In some implementations, information can be encoded according to a differential pulse-code modulation (DPCM) coding of coefficients. DPCM coding of block information can be used to increase the compression efficiency for screen content sequences. DPCM covers cases where traditional DCT/DST based transforms do not offer compression benefits and a coding block has samples with clear horizontal or vertical spatial correlation. In some implementations, DPCM can be used as a part of a separate intra coding mode called block DPCM (BDPCM). In some implementations, BDPCM can be applied to the quantized residuals and in some cases, is only used when the transform skip (TS) flag is signaled at the TU level. DPCM functions by predicting samples in a coding block from previously coded samples along the horizontal or vertical direction.

According to the FSC mode, the entropy coding and decoding process can be modified for single or a collection of coding blocks (CBs). The FSC mode can also introduce signaling constraints on existing syntax elements of a CB (or a collection CBs) and on multiple transform units (TUs) that reside under these coding blocks, macro blocks or prediction units. In some implementations, the FSC mode can provide compression gains due to more efficient entropy coding for coding blocks. Further, the FSC mode can provide simpler and more efficient context derivation and modeling when performing coefficient coding for level and sign values (e.g., compared to encoding and decoding performed without the FSC mode). In some implementations, the FSC mode allows the encoder and the decoder to skip parsing of certain syntax elements (e.g., the transform type, last significant position, and/or TU skip flag) and simplifies the overall coefficient decoding process. The FSC mode can be used for individual coding blocks or single TUs for finer granularity, or for a collection of CBs such as coding-tree-units (CTUs), super-blocks for control at medium granularity or for a collection of CTUs, slices, frames or entire video sequences for providing high-level granularity usage of the FSC mode.

In some implementations, a syntax element (e.g., a data flag or other data element named "fsc_flag" or "fsc_index") can be signaled from the encoder to the decoder side at the CB level (e.g., as a part of the bitstream). This syntax element informs the decoder that all transform units (TUs) residing under the same CB/PU/MB may share a common set of encoding parameters, such as a common inferred transform type, a common coded transform block flag, a common coefficient coding method, a common scan order type and direction, a common set of coefficient coding contexts, common transform sizes, or any combination thereof. In some implementations, this inferred information can be pre-determined and fixed whenever the FSC mode is used. In some implementations, a most likely option for each parameter (e.g., type/flag/context set, etc.) can be predicted based on the statistics of the present CB and neighboring CBs.

In general, a block that is hierarchically larger or equal to a TU (e.g., CU, MB, PU) can be referred as a coding block (CB). A single CB can have common information and common syntax elements that can be reused by all the TUs residing under itself. A super-block (SB) or a coding-tree-unit (CTU) can contain multiple CBs, and a slice can contain multiple CTUs or SBs. The examples below describe examples of FSC mode usage at the CB level. However, in practice, these use cases however can be generalized for CTU, SB, slices, frames, and/or sequences.

In some implementations, a flag/index or mode decision (e.g., "fsc_flag" or "fsc_idx") can be signaled at the CB level, which indicates that one or multiple transform units residing within the same CB can have a specific transform type. For instance, if a 16×16 CB contains 4 TUs of size 8×8, then the transform type for these TUs can be inferred to be IDTX if fsc_idx=1. This is shown, for example, in FIG. 6. In some implementations, fsc_idx=2 can indicate that all TUs residing under the same CB can use a H_DCT type of transform (e.g., DCTb in horizontal and identity in vertical). Further, a different fsc_idx={1, 2, 3, 4, . . . } can be signaled for each transform type to indicate different transform types. Further illustrative examples are provided below.

In some implementations, if fsc_idx=1 is signaled at the CB level, then the transform type is not explicitly signaled to the decoder as IDTX for individual TUs. The transform type can be inferred at the decoder as IDTX for each TU. Alternatively, if fsc_idx=0, then the transform type is not inferred for any of the TUs and may be signaled for each TU separately.

In some implementations, if fsc_idx=1 is signaled at the CB level, then the transform type is not explicitly signaled to the decoder as IDTX for individual TUs. If fsc_idx=0, then the transform type may be inferred as a non IDTX type, indicating that a specific transform is disabled for the individual TUs.

In one example, the block size and partition of CBs into TUs can be arbitrary. For instance, an 8×32 CB can be divided into 2 TUs of size 8×16, and since the fsc_idx is signaled at the CB level, any number of TUs residing in the same CB will have an inferred transform type as IDTX. The same logic can apply to arbitrary partitions, meaning that a CB can have an arbitrary number of TUs of any partition size N by M.

In some implementations, fsc_idx can be signaled per color component separately. This can be implemented, for example, when the CB information is decoupled for luma and chroma channels, such as in separate coding-trees for luma and chroma components or full or semi decoupled partitioning for luma and chroma components. As an example, the luma channel can have fsc_idx=1, which can indicate that the luma TUs residing under the same CB will infer transform type as IDTX without signaling transform type. Further, the chroma TUs can signal their own transform types if the chroma fsc_idx is 0. Alternatively, a decoder can always infer fsc_idx as 1 or 0 for chroma colors without requiring the encoder to signal it explicitly.

In some implementations, the "fsc_flag"/"fsc_index" can be context coded using an arbitrary entropy coding method such as Huffman coding, Exponential-Golomb Coding, Unary coding, or arithmetic coding methods such as context-adaptive binary arithmetic coding (CABAC) or multi-symbol arithmetic encoding. If arithmetic coding is used, then coding efficiency may be increased by defining contexts models based on the intra/inter prediction modes, partition type, picture/slice type, quantization parameter, reference frames, motion information of the current block or neighboring blocks. For instance, if the intra prediction mode for a given CB is PAETH mode (e.g., in the AV1 video coding format), a separate context can be used to code the fsc_index. In another example, a separate context model can be used for each intra prediction mode (e.g., Horizontal, Vertical, DC, SMOOTH_V and SMOOTH_H in AV1, etc.). The same rule can apply to inter prediction modes.

In some implementations, with arithmetic coding, "fsc_index" can be context coded based on block size information. For example, a 4×4 block and an 8×8 block can use FSC mode in different amounts. In this case, a separate context model can be used for different block sizes. In one example, a separate context model can be used for each N by M block size. In another example, context models can be defined based on block size groups. For instance 4×4, 4×8 and 8×4 blocks can share a single context.

In some implementations, "fsc_index" can be signaled at TU level, and can be signaled within the first TU in coding order. The decoder can infer, for the remaining TUs within the same CB, the signaled "fsc_index" from the first decoded TU.

In some implementations, the context coding and signaling schemes above can be combined.

In some implementations, "fsc_index" can be signaled at the CB level and all TUs residing under the same CB can use a specific transform type. For instance, if fsc_index=2, then all TUs can assume that a V_DCT transform is used without explicitly decoding the transform type. In this case, a CB will share this information with all of its resident TUs.

In a general case, "fsc_index" can be a multi-symbol syntax element and each separate "fsc_index" index value can represent a different inferred transform type. This is illustrated in Table 2 below, where "fsc_index" is a 6 symbol syntax element and, depending on the "fsc_index value," all TUs can infer a specific transform type. Note that, FSC can be an M-symbol syntax element to reduce the signaling overhead. For instance, only 0, 1 and 2 modes can be signaled to the decoder to allow for IDTX, DCT_DCT transform types.

TABLE 2

A multi-symbol design for the "fsc_index,"
where each separate index indicates a different
inferred transform type for TUs residing in a CB.

|  | FSC OFF | IDTX/ Transform Skip | DCT_DCT | V_DCT | H_DCT |  |
| --- | --- | --- | --- | --- | --- | --- |
| fsc_index | 0 | 1 | 2 | 4 | 5 | ... |

In some implementations, "fsc_index" can be signaled only for a subset of prediction modes. For example, "fsc_index" can be signaled when intra prediction mode is either: DC_PRED, H_PRED, V_PRED, SMOOTH_PRED and SMOOTH_V_PRED, SMOOTH_H_PRED, PAETH_PRED. Similarly, "fsc_index" signaling can be avoided for angular/directional modes such as D45_PRED, D67_PRED. In this case, for the angular modes, the decoder will not use FSC and infer fsc_index=0.

In some implementations, "fsc_flag"/"fsc_index" can be context coded based on the statistics and syntax elements used in the neighboring CBs of a present CB. For instance if the left and above CBs both have fsc_index=1, then a context index=2 can be used to code the "fsc_index" for the present CB. Likewise, if only one of the top or left CB has fsc_index=1, then a context index=1 can be used. If neither left or above CB uses FSC mode, then a default context index=0 can be used. This context derivation can be generalized for different "fsc_index" values and for different transforms.

In some implementations, coding of flags and mode decisions for certain coding tools (e.g., the multiple reference line (MRL) flags/indices, palette mode flags/indices, intra block copy (IBC) flags/indices, inter single prediction, inter compound mode, wedge mode, delta angle signaling, filter intra modes, and secondary transform related flags and indices, etc.) can be skipped and these tools can be disabled when fsc_index=1 (e.g., is non-zero).

This means that if a CB uses the FSC mode and signals fsc_index=1 to the decoder side, the decoder infers that MRL intra prediction is turned off and only a single reference line is used for intra prediction. The decoder infers "mrl_index" as 0 without needing to decode this information.

In another example, if a CB uses FSC mode, then the decoder can infer the palette mode to be turned off and infer all palette flags and mode decisions to be 0. The decoder can skip decoding palette color information and any related syntax elements.

In another example, if a CB uses FSC mode, then the intra block copy (IBC) can be disabled for a coding block with relevant signaling and inference rules for the IBC mode also can be disabled.

In another example, if a CB uses FSC mode, then the offset based intra prediction refinement (ORIP) can be disabled for a coding block with relevant signaling and inference rules for the IBC mode also can be disabled.

In another example, intra secondary transform (IST) (e.g., in the AOM Video Model (AVM)) can be disabled when fsc_idx=1. This means that if FSC mode is used at the CB level, IST is turned off at the decoder and IST related indices and flags do not have to be signaled for different TUs. In the context of the Versatile Video Coding (VVC), this would mean that a mode decision signaled at the CB or coding unit level would disable the signaling of the secondary LFNST transform related flags/indices ("lfnst_index") at the CU or TU level.

In some implementations, if fsc_index=1, then signaling of the last coefficient position for each TU residing under the same CB can be avoided and the decoder can instead decode all the coefficients in all TUs without using the last coefficient position. This simplifies the decoding process by removing coding/decoding of the last significant coefficient position, especially when the transform type is identity. This may also reduce parsing dependency and associated delays, since decoding of coefficients in FSC mode will no longer rely on decoding the last significant position.

In some implementations, "fsc_index"/"fsc_flag" can be signaled before the intra/inter prediction mode. For example, if fsc_index=1, then a PU at the decoder side can infer the intra prediction type to be DC_PRED without explicit signaling. Likewise, if fsc_index=2, then H_PRED may be inferred.

In some implementations "fsc_flag", trellis quantization (e.g., in AV1) or other state dependent quantization schemes can be disabled in a video codec for the present CB and all TUs residing under it when fsc_index=1. This means that CBs that use the FSC mode may perform a simpler quantization available in the present codec.

In some implementations, when fsc_index=1, an alternative quantizer can be used specifically designed for the FSC mode. This quantizer can quantize each coefficient in a TU with the same quantization parameter or a flat quantization matrix. This is as opposed to using special quantization rules for the DC term (e.g., as in AV1/AVM design). The encoder can quantize the coefficients with this quantizer whenever the FSC mode is used for a present CB.

In some implementations, a parity hiding (PH) scheme can be used normatively to restrict signaling of certain coefficient level values. According to a PH scheme, samples are decoded in a given scan order, and the decoded coefficients are compared to a PH rule. If a decoded coefficient satisfies the PH rule, a following coefficient's parity information is hidden (e.g., as either even or odd). This can reduce signaling overhead for level coding.

In some implementations if fsc_flag=1 or fsc_index=1, the PH scheme can be disabled for a current CB, TU, or a group of coefficients that share the FSC mode. In this case, a decoder can first decode the FSC flag or index and infer that no parity hiding will be performed for the current coding block or region.

In some implementations, when "fsc_flag" or "fsc_index" is equal to 1, then the encoder can use the pixel domain distortion when computing the rate-distortion (RD) related values. For example, in AV1 and AVM, if a TU contains multiple coefficients, RD distortion is calculated in the transform signal domain (e.g., between scaled transform domain signals). If "fsc_flag" or "fsc_index" is equal to 1, the present block can instead calculate the distortion in pixel domain.

In some implementations, a transform block skip flag ("txb_skip") flag can be coded prior to encoding TU coefficients. This "txb_skip" flag indicates whether the TU contains all zero coefficients, such that the entirety of the TU coefficients can be inferred as 0 without explicitly signaling them. In some implementations, when fsc_index=1 or fsc_index>0, then for each TU, a separate context model can be used to code the "txb_skip" flag. This is because the statistics of FSC blocks are different from the non-FSC blocks. For example, a context index 0 can be used for non-FSC blocks when the TU size equals to the CB size. A separate context index cIdx=13 can be used when fsc_index>0 and the TU size equals to the CB size. For CBs containing multiple TUs, when fsc_flag=1 or fsc_index>0 and context offset can be added: (cIdx=13+offset) such that an alternative context is used. The value of the offset term can be selected based on the neighboring TUs coefficient values and statistics.

In some implementations, when "fsc_flag" or "fsc_index" is equal to 1, then the decoder can infer that all sub TUs residing under the same CB have txb_skip=1. In this case, it is not necessary to signal a skip flag for each TU separately and the decoder can simply be infer that all TUs to be coded transform blocks.

In some implementations, when "fsc_flag" or "fsc_index" is equal to 1 (or some non-zero value), then the decoder can infer that all sub TUs residing under the same CB have a fixed transform size. Thus, it is not necessary to signal a transform size flag/index for each TU separately. For instance, if FSC mode is used, then all TUs in a present CB can have a fixed transform size of 8×8. This means that a CB will be made of TUs having equal sizes. This fixed transform size can be arbitrary, such as 4×4, 8×16, or any other size, or even equal to the maximum allowed transform size.

In some implementations, if a codec performs lossless coding (e.g., there is no quantization and loss of information), then FSC mode can be enabled automatically for lossless blocks without explicit signaling of "fsc_flag" or "fsc_index."

In some implementations, if a codec performs lossless coding (e.g., there is no quantization and loss of information), then FSC index can be signaled in the bitstream and can indicate a lossless coding mode when used with the quantization parameter (QP) value. For instance, if "fsc_flag=1" and QP value is less than or equal to a threshold "T" (e.g., QP<4), then the decoder can assume that the current block is lossless coded. Accordingly, the decoder can disable the quantization and transform stages when decoding the block.

In some implementations, FSC mode can be inferred based on the present CBs QP value and the signaled delta QP. For instance, if the QP value per block is less than a threshold such as 12, then FSC mode can be used without explicit signaling of "fsc_flag" or "fsc_index."

In some implementations, if fsc_index=1 is signaled for a coding block, then the absolute values of coefficients or "levels" of all resident sub-TUs can be coded in a forward scan pass (e.g., as opposed to a reverse scan pass, as in AV1). This is illustrated in FIG. 7, where the AV1's default coefficient coding on the left-hand side uses a reverse coding pass (as shown with directional dashed arrows), whereas the FSC mode on the right-hand side of FIG. 7 uses the new forward coding pass when encoding the levels.

Figure 7:
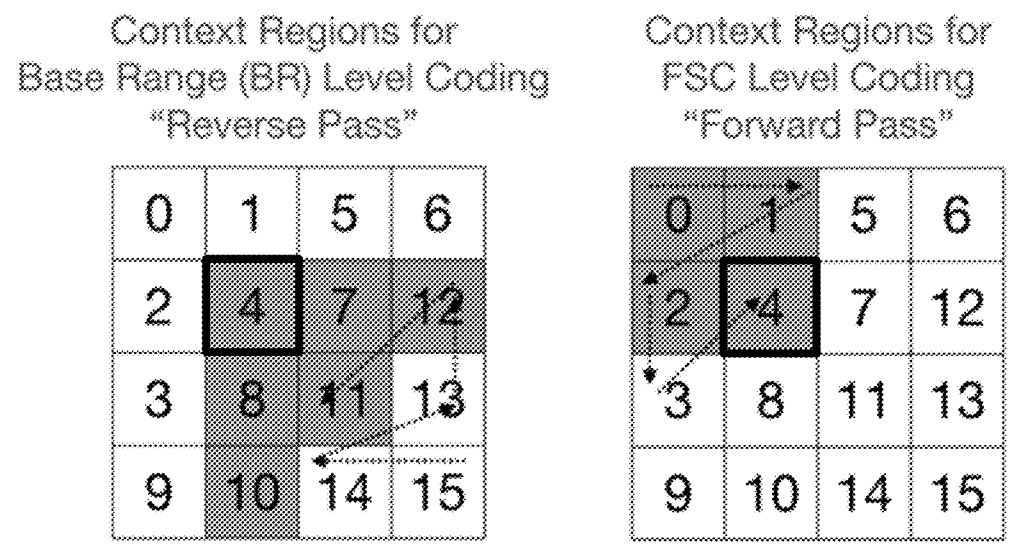

For example, if fsc_index=0, the level values are coded according to the reverse 2D zig-zag scan indices 15, 14, 13, 12, . . . until a particular block is reached (e.g., in the example shown in FIG. 7, the block having the index 4, indicated by a bolded outlined). On the other hand, if fsc_index=1, then for all TUs residing under the same CB, a forward scan can used to encode the level information starting from indices 0, 1, 2, 3, . . . until a particular block is reached.

In some implementations, the scan direction is independent of the transform type. This means that even if the transform type is DCT_DCT, a forward scan can be used if fsc_index=1.

Figure 8:
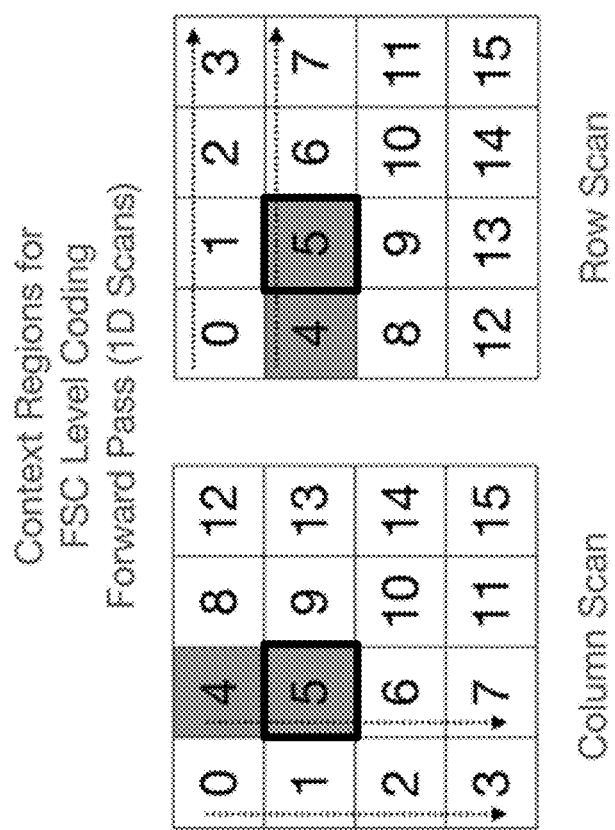
FIG. 8 is a diagram of example context regions defined for level coding with 1D transforms and 1D scans for the FSC mode.

In some implementations, the scan type can be arbitrary and is not constrained as zig-zag. For example, the scan type can be a diagonal scan, raster scan, row scan, column scan, etc. The reverse scan in these cases can map the last index of the default scan to be the first index. An example is shown with the forward row scans (dashed lines) in FIG. 8. This alternative scan order can be inferred from the transform type or other statistics of the present coding block/transform unit and neighboring blocks.

In some implementations, a separate index can be signaled to the decoder as either as part of the "fsc_index" binarization or as a separate syntax element "fsc_scan_idx" to select different scan orders. For instance, if fsc_scan_idx=0, then a forward pass zig-zag scan can be used during coefficient coding. Alternatively if fsc_scan_idx=1, then a separate scan, such as a diagonal scan, can be used. In other words, FSC mode can signal and infer to use different scan orders. Alternatively, the FSC mode can use a different scan order that is not strictly the reverse of the scan orders available in a codec. This scan can be specifically designed to maximize the compression efficiency when encoding FSC blocks with entropy coding methods.

TABLE 3

Context derivation for coding the sign information in FSC mode

| Context Index | Sign of the Below Neighbor | Sign of the Right Neighbor | Coefficient Level Value |
|---|---|---|---|
| 0 | + | + | Less than threshold |
| 1 | + | + | More than threshold |
| 2 | + | − | Less than threshold |
| 3 | − | + | More than threshold |
| 4 | − | − | Less than threshold |
| 5 | − | − | More than threshold |

In some implementations, the context derivation for level coding in FSC mode can be simpler than the regular coefficient coding in AV1. This is shown in FIG. 7 on the right hand side for a 2D zig-zag scan. In this example, a level value at coefficient index 4 can be coded using a forward scan, and the level information from indices 0, 1, 2 and 3 are available for context derivation. A small neighborhood (e.g., with shaded, non-bolded blocks) can be used (e.g., coefficient indexes 0, 1, 2) to determine an appropriate context model when encoding coefficient having an index 4. A sum of the absolute values in this shaped neighborhood can be used to select an appropriate context model to encode the coefficient at index 4. This context neighborhood is smaller than that of regular AV1 coding, as shown in the left hand side in FIG. 7. In another example, the number of neighbors to derive context information can be arbitrary. For example, on the right hand side of FIG. 7, the FSC mode can use coefficient indexes 1 and 2 to select a context offset when encoding coefficient index 4.

In some implementations, the absolute level values in the neighboring regions can be summed and/or thresholded to determine a context index for encoding coefficient index (e.g., in the example shown in FIG. 7, the coefficient index 4). For instance, if level information from indices 0, 1, 2 in FIG. 7, right hand side, sum to a value of 5, a context index of 5 can be used when coding the base range (BR) part of the current coefficient in AV1. A derivation rule can be placed to make sure the summed level value resides between 0 and some threshold value (e.g., 6) by taking the maximum value of the sum (e.g., ctxId=max(sum_neighbors, 6)) to select an appropriate context.

In another example, context derivation region can be different when encoding the low range (LR) of the current coefficient as compared to the BR part. The LR part can use additional or less neighboring samples to compute the summed absolute level value.

In another example, transform size (e.g., "TX SIZE" in AV1) can be used to select a different context index. For instance, if either horizontal or vertical TU dimension is larger than 8×8 for BR, ctxId=min(sum_neighbors, 6)+offset, where offset can be 7. In this case, smaller TUs can code BR symbols using "ctxIds" from 0 to 6 (e.g., derived from min(sum_neighbors, 6)) and larger blocks can use "ctxIds" ranging from 7 to 13. Note that LR context derivation can follow a similar logic.

In another example, contexts can be defined for different color components.

In some implementations, the signs of the transform coefficients can be coded in reverse scan order with separate probability context models when "fsc_flag" "fsc_index" is equal to 1 (e.g., as opposed to bypass coding as in AV1 coefficient coding). Note that this context coding is only used for the FSC mode. The context model derivation for the coefficient signs can be derived based on:

A separate context model. A separate context model can be used, for example, for luma and chroma when encoding the sign information or color plane.

The level information for the same coefficient. For instance, if the coded level value is larger than the low range limit (e.g., greater than 14), the base range limit (e.g., 3), or an arbitrary threshold, then a separate probability model can be used to encode the sign value. If the coded level value is less than this threshold then another context model can be used.

Figure 9:
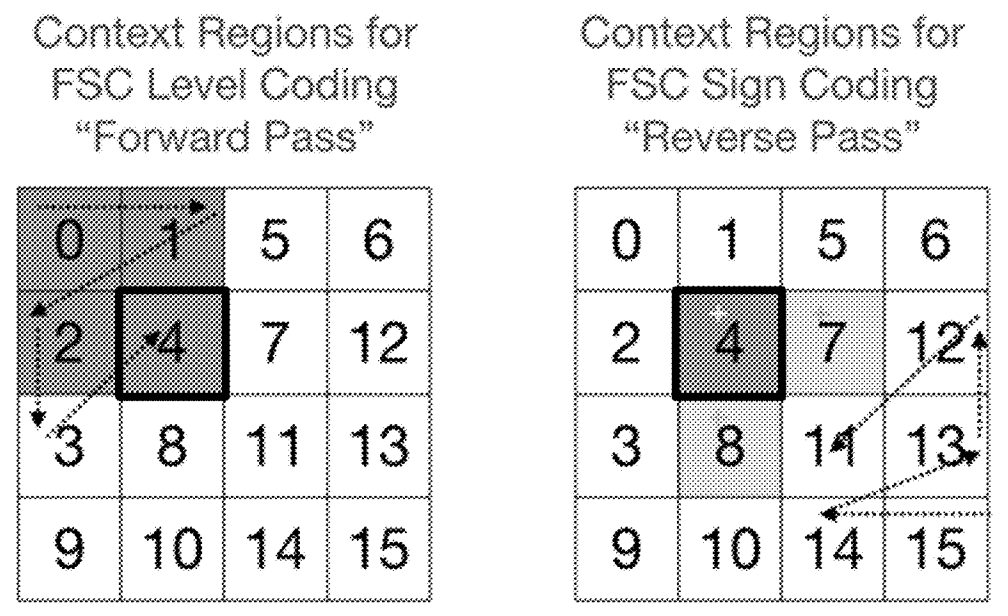

The previously coded level and sign information. For instance, in FSC mode, the level information can be coded in a forward scan pass and the sign information in a reverse scan pass. This two-pass approach is shown in FIG. 9, where the left-hand side shows the forward pass level coding (with context derivation neighborhood for level coding shown by the shaded, non-bolded region) and the right-hand side shows the reverse sign coding pass, where the shaded, non-bolded region is used to derive the sign context index for coding sign information. When coding the sign of coefficient 4 in FIG. 9 (indicated by a bolded outline), a separate probability model can be selected if the signs of the neighboring coefficients 7, and 8 are both positive. Table 2 shows several examples of context derivation rules for the sign coding. As an example, if both neighbors have negative sign and the coded level value is more than a threshold T=4, a context index ("ctxIdx") 5 can be selected.

Note that the neighborhood region for the signs can be arbitrary and not limited of only the ones shown in FIG. 9. For example, on the left-hand side, the shaded, non-bolded region may be extended by including coefficient index 11.

In some implementations, the sign context can be derived by summing the number of positive signs and negative signs within an N×M neighborhood around the current coefficient. If the overall sum exceeds certain thresholds, additional contexts can be derived. This aspect extends the context indices presented in Table 3.

In some implementations, FSC sign coding can use a forward pass instead of the reverse pass shown in FIG. 9. This forward pass can be aligned with the pass for level coding in FSC mode.

In some implementations, the FSC mode can use a different number of symbols when encoding levels. For instance, the default coefficient coding in AV1 and AVM uses 4-symbols to code the base range and low range values. Instead, if fsc_index>0 (e.g., meaning that FSC mode is used), levels can be coded with different symbol counts. For instance, first a 2-symbol syntax element can be used to code whether a coefficient is zero or not. Then, depending if the coefficient is not zero, a 4 symbol syntax element can be coded to indicate whether the final coded level is either {1, 2, 3, 4}. This operation can be repeated N times to code a desired number of context coded levels.

In some implementations, different spatial regions of a TU can code different number of symbols for each coding pass and can use different entropy coding models or coefficient coding contexts. In some implementations, this may be applied to blocks when FSC is disabled with fsc_flag=0 or fsc_index=0. That is, the decoder can refraining from applying a spatial region dependent entropy coding scheme for coefficients of FSC blocks. Instead, all spatial regions can be treated the same.

In an alternative embodiment, entropy coding regions for FSC coded blocks can be spatially different from non-FSC blocks. In this case, FSC coded blocks can apply different entropy coding rules to each of the spatial regions.

In some implementations, the FSC mode can use a different entropy coding when coding the high-range (HR) levels. For example, AV1 may use Exponential-Golomb to encode HR levels. The FSC mode can use alternative entropy coding methods and binarization schemes to encode higher bypass coded levels. Some examples include Huffman coding, Golomb-Rice coding, Exponential-Golomb, etc. The FSC mode can select one or a collection of these methods depending on the statistics of the current block and the current level value.

In some implementations, the FSC mode can be used at the SB or CTU level. For instance, "fsc_flag" or "fsc_index" can be signaled at the CTU/SB level, and the inference and coding rules explained above for the FSC mode can apply to all CBs that are present under the same CTU/SB. For example, a CTU/SB can have 4 CBs, each having 4 TUs. Since the FSC mode will be signaled at the SB/CTU level, the final 16 TUs can share and infer the information detailed above for the CB level case.

In some implementations, the FSC mode can be used at the SB/CTU level, and all the CBs/PUs residing under the SB/CTU can share the same intra/inter prediction mode. For example, for intra blocks, if "fsc_index" or "fsc_flag" is equal to 1, then all PUs can use a H_PRED mode for intra prediction. This mode can be signaled only for the first PU in a given CTU/SB, and other neighboring PUs within the same CTU/SB can infer the prediction mode from the first PU.

In some implementations, the FSC mode can be used with intra-block-copy (IBC). In this case, IBC can be used to first find a closest block that best represents the present coding block in pixel domain. Then, a residual signal can be extracted between the present block and the closest IBC reference block. The residual can be encoded in the bitstream using the FSC mode.

In some implementations, if the FSC mode is used for an inter block, then inter-prediction mode can be inferred as NEARMV or NEARESTMV in AV1, in which case motion vectors for the inter-predicted block will be extracted from a closer spatial neighborhood. In this case, signaling costs associated with signaling the inter-prediction modes can be avoided.

In some implementations, if the FSC mode is used, then loop restoration filters, CDEF, or other filters can be disabled for a present CTU/SB, or restoration unit. In this case, it is not necessary to signal syntax elements associated with these filters. Alternatively, the strength of these filters loop filters can be adjusted or inferred based on the FSC mode.

In some implementations, the FSC mode can be controlled by a higher slice/frame picture or sequence level flag/index, such that if this higher level flag is non-zero, then FSC flag/index is inferred as non-zero for all lower level coding blocks. This may avoid signaling costs associated with signaling FSC flag/index if the content or coding configuration dominantly benefits from the FSC coding. For instance, for lossless coding, the FSC mode can be enabled all for all blocks at the higher level.

In some implementations, it is possible to use DPCM coding when the FSC mode is used at the CB level. In this case, if fsc_index>0 at the CB level, then an additional syntax element (e.g., "dpcm_flag" or "dpcm_index") can be signaled at the CB level to indicate whether or not DPCM is applied with FSC mode before the actual coefficient coding stage. If DPCM prediction is applied either horizontally or vertically after a suitable transform such as IDTX, the coefficient coding part of the FSC mode can encode the DPCM predicted samples. The coefficient coding is in FSC mode after DPCM, and can follow the examples presented in FIGS. 7 and 8 with forward level coding pass with reduced contexts and reverse sign coding pass in FIG. 9.

In some implementations, if fsc_index=0, then the "dpcm_index" is not signaled in the bitstream and the decoder infers dpcm_index=0.

In some implementations, if fsc_index=1, then the "dpcm_index" can be coded in the bitstream to indicate the DPCM prediction direction (e.g., horizontal prediction or vertical prediction). In this case, "dpcm_index" can be a 3 symbol syntax element with dpcm_index=0 indicating no DPCM applied, dpcm_index=1 indicating vertical prediction is used after the IDTX transform and dpcm_index=2 indicating horizontal prediction is used after IDTX transform.

In some implementations, if fsc_index=1, then the "dpcm_flag" can be signaled as 1 and the DPCM prediction direction can be inferred from the intra prediction mode. For example, if dpcm_flag=1 and intra prediction direction is horizontal, then DPCM can use horizontal prediction. Similarly, if dpcm_flag=1 and intra prediction direction is vertical, then DPCM can use vertical prediction. This means that the "dpcm_flag" can be a 2-symbol syntax element with 1 or 0 indicating DPCM on or off.

In some implementations, context derivation for the level coding for BR and LR range coding and sign coding in FSC mode can be modified. If DPCM is non-zero, context indices for level coding for BR and LR ranges can be selected with an appropriate offset (e.g., ctxId=min(sum_neighbors, 6)+offset2, where offset2 is an offset that will allocate probability models specifically for the non-zero DPCM modes). This offset separates the context indexes of non-DPCM blocks from DPCM blocks, such that a DPCM coded block does not use the context models of a non-DPCM block. For instance of non-DPCM blocks use min(sum_neighbors, 6) and a context range of 0, . . . , 6 and offset2=7 will ensure DPCM blocks will use context indexes of 7, . . . , 13.

In some implementations, sign coding contexts in FSC mode can use different contexts if DPCM mode is non-zero. As an example, this can be performed by adding an appropriate offset to the sign context ids or by extending Table 2, as in Table 3.

In some implementations, "dpcm_index" can be context coded and a separate probability model can be selected based on the color component type (e.g., luma or chroma), intra prediction mode, coding block size, and statistics of neighboring CBs.

In one example, DPCM can be applied to the residual samples after IDTX transform, such that after performing intra prediction residual samples can be predicted with either horizontal or vertical DPCM. In another example, DPCM can be applied after quantizing the intra predicted samples, but before coefficient coding. Note that the decision to apply DPCM is made at the CB or prediction unit level, and sub TUs residing under the same CB (e.g., as shown in FIG. 6) have to apply DPCM based on this higher level decision.

In some implementations, an encoder can analyze the statistics of current coding block and/or neighboring blocks to determine if it is likely/unlikely to use the FSC mode at the block/tile/slice level. If the encoder deems it unlikely that a current block will use FSC mode, then the encoder search for FSC may be turned off. Alternatively, such statistics can be used to limit which prediction modes could be searched for the FSC mode. For example, if the encoder determines from the statistics that FSC mode for a current block is not likely to be used with angular intra prediction modes, these could be removed from the FSC encoder search and encoding time can be reduced. These statistics can be extracted from the present coding block/CTU or neighboring blocks/CTUs using machine learning models. Likewise, these statistics can be determined based on neighboring blocks coding modes.

In some implementations, if both left and above coding blocks of a present CB use DC_PRED, encoder can be sped up by search FSC mode with only DC_PRED, and a few additional modes such as SMOOTH, horizontal and vertical prediction instead of the whole prediction set.

In some implementations, FSC mode can be used to when encoding the intra block copy (IBC) residuals. In this case, an FSC flag may be signaled in addition to the IBC flags/indices to indicate that IBC coded block will use the context models, and entropy coding method that FSC blocks normally use.

In some implementations, FSC mode can be used to when encoding the intra block copy (IBC) residuals without explicitly signaling an FSC flag. In this case, if block uses IBC mode and a transform type is signaled to the decoder as Identity Transform (IDTX), then the decoder can infer that the IBC residuals are decoded with the context models and entropy coding method that are used by the FSC blocks (e.g., forward scan order, FSC entropy models, disabling last position, etc.).

Figure 10:
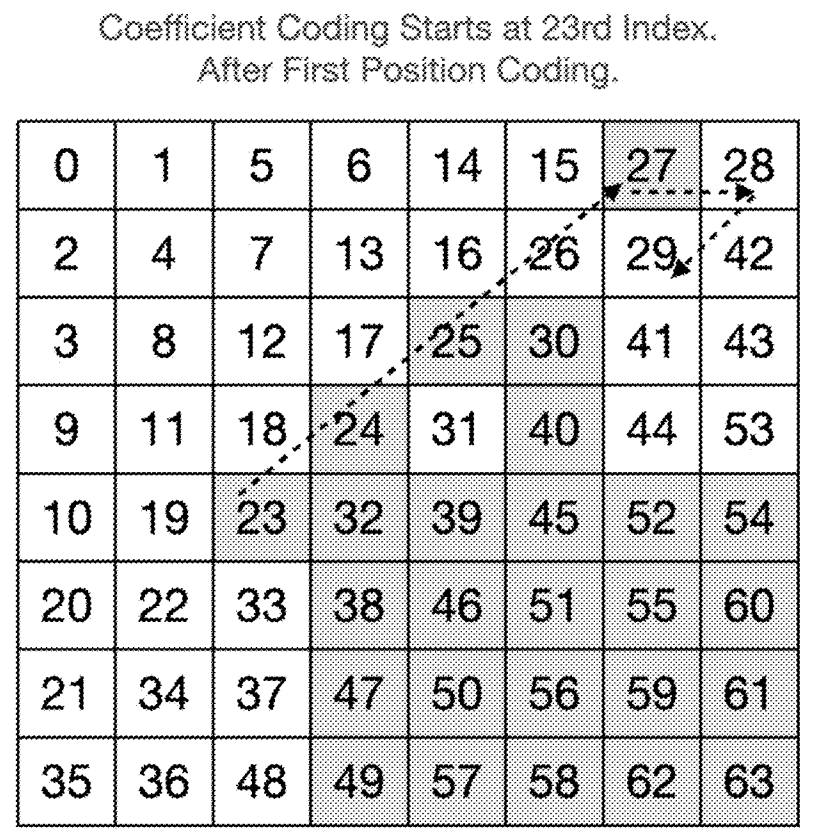

In some implementations, FSC mode can encode a first coefficient position or beginning of block (BOB) syntax prior to signaling FSC coefficients (e.g., level and sign). This signaled BOB syntax indicates the first non-zero coefficient in a coded TU. In FIG. 10, an example is shown for an 8×8 TU where coefficient indices that have "0" levels are unshaded and non-zero coefficient levels are indicated with shading. In the forward scan order that FSC mode uses, the first non-zero coefficient position coincides with coefficient index 23. This information is coded as a separate syntax prior to level and sign coding. Since all the coefficients before index 23 are zero, these values can be skipped in entropy coding. That is, all the coefficients up until index 23 are not coded in the bitstream and inferred as "0." The coefficient index 23 is implicitly coded with BOB syntax. This means that the level information at index 23 is guaranteed to be non-zero. Therefore, when coding the base level for index 23, a decoder can decode 1 symbol less and infer the final value to be at least 1. In some examples, the block size, and scan can be arbitrary, but the first position may indicate a relative location of the first non-zero coefficient in a TU.

In some implementations, FSC mode can encode BOB syntax with a group binarization. That is, for a block size of 4×4, there are 16 possible indices for BOB (0, . . . , 15). Therefore, first a 6 multi-symbol syntax element can be coded to indicate if the first coefficient index belongs to one of the following groups:

Symbol 1: [0],
Symbol 2: [1],
Symbol 3: [2],
Symbol 4: [3, 4],
Symbol 5: [5, 6, 7, 8],
Symbol 6: [9, 10, 11, 12, 13, 14, 15].

Note that here, Symbols 4, 5 and 6 indicate multiple possible first position indices. For example, Symbol 6 can mean that first position can be anywhere in range [9, 10, 11, 12, 13, 14, 15]. In this case, a remained can be first calculated as "remainder=first_position−9". The remainder can then be coded using a similar group partitioning and/or bypass coding. Note that this group coding idea can be extended to different block sizes and other group partitioning is possible. Different TU sizes can use different symbols when encoding groups. For instance, if a TU size is 16×16, a total of 12 symbols can be used instead of 6, as shown above.

Example Processes

Figure 11A:
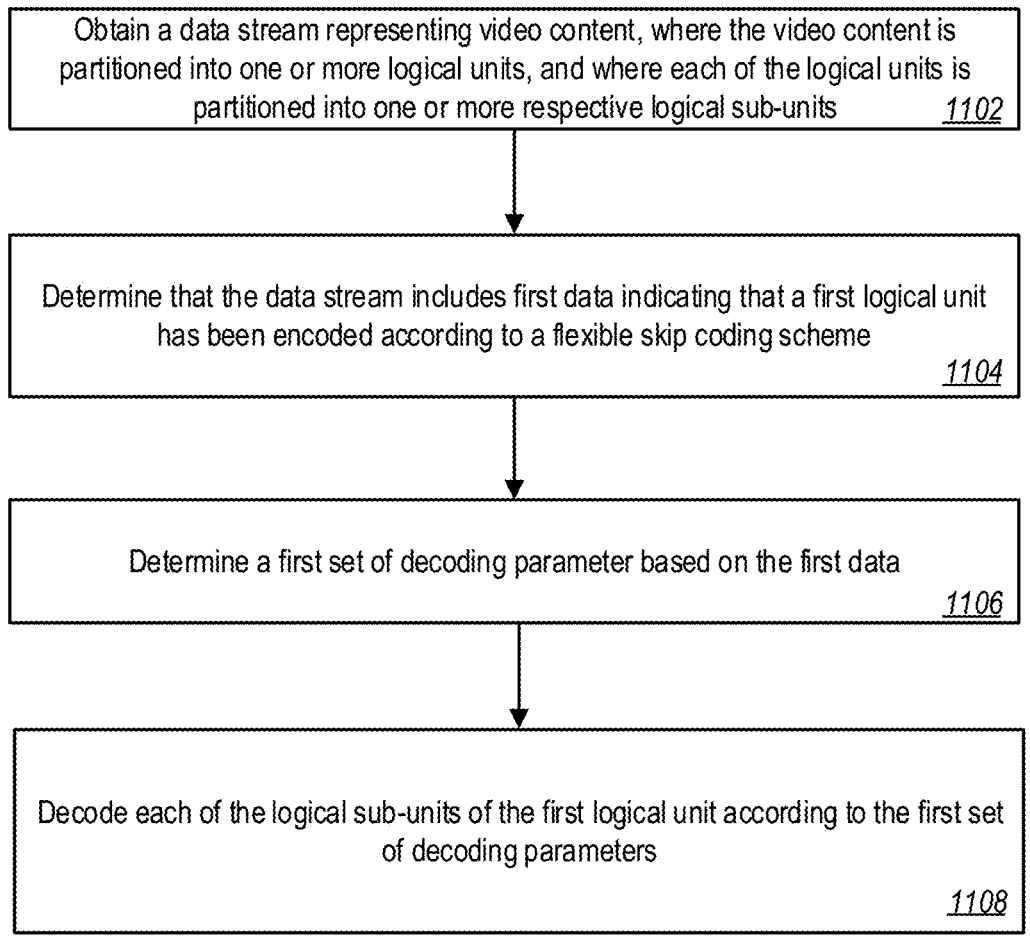
FIGS. 11A and 11B are diagrams of example processes for processing a data stream representing video content.

FIG. 11A shows an example process 1100 for processing a data stream representing video content. The process 1100 can be performed, at least in part, using a system having a decoder (e.g., as shown in FIGS. 1 and 2).

According to the process 1100, a decoder obtains a data stream representing video content (block 1102). The video content is partitioned into one or more logical units, and each of the logical units is partitioned into one or more respective logical sub-units.

In some implementations, each of the one or more logical units can be one or more of: a coding block of the video content, a macroblock of the video content a prediction unit of the video content, a coding-tree-unit of the video content, a super-block of the video content, a slice of the video content, a tile of the video content, a segment of the video content, or a picture of the video content. Further, each of the one or more logical sub-units can be a transform unit of the video content.

The decoder determines that the data stream includes first data indicating that a first logical unit has been encoded according to a flexible skip coding scheme (block 1104). As an example, the first data can include a data flag or other data element, such as a data flag or data element named "fsc_flag" or "fsc_index," as described above.

In response to determining that the data stream includes the first data, the decoder (i) determines a first set of decoding parameters based on the first data (block 1106), and (ii) decodes each of the logical sub-units of the first logical unit according to the first set of decoding parameters (block 1108).

In some implementations, according to the process 1100, the decoder can determine that the data stream includes second data indicating that a plurality of second logical units has been encoded according to the flexible skip coding scheme. As an example, the second data can include another data flag or other data element, such as another data flag or data element named "fsc_flag" or "fsc_index," as described above. Further, in response, to determining that the data stream includes the second data, the decoder can determine a second set of decoding parameters based on the second data, and decode each of the logical sub-units of the second logical unit according to the second set of decoding parameters.

In some implementations, the first data can indicate that one or more specified color components of the first logical unit have been encoded according to the flexible skip coding scheme. Further, decoding each of the logical sub-units of the first logical unit according to the first set of decoding parameters can include decoding the one or more specified color components of the logical sub-units of the first logical unit according to the first set of decoding parameters. The one or more specified color components can include a luma component and/or a chroma component.

In some implementations, the first set of parameters can include: a common transform type associated with each of the logical sub-units of the first logical unit, a common transform coefficient scan order type associated with each of the logical sub-units of the first logical unit, a common transform coefficient scan direction associated with each of the logical sub-units of the first logical unit, a common transform coefficient coding context scheme associated with each of the logical sub-units of the first logical unit, or a common transform size associated with each of the logical sub-units of the first logical unit.

In some implementations, the common transform type can be an identity transform type, a discrete cosine transform type, an asymmetric discrete sine transform type, or a learned transform type. A learned transform type can include, for example, a transform kernel trained from data to fit specific content. Example learned transform types include a learned non-separable transform (LFNST) (e.g., as implemented in VVC) or intra secondary transform (IST) (e.g., as implemented in AVM). In some implementations, a kernel can be trained specifically for the FSC mode. The training can be performed based on basic machine learning models such as SVD-based training and/or regression, or can be be performed with neural networks.

In some implementations, the common transform coefficient scan order type can correspond a forward transform coefficient scan order for encoding level information regarding one or more transform coefficients. Further, the common transform coefficient scan direction can be one of: a forward up-right diagonal scan, a down-right diagonal scan, a forward zig-zag scan direction, a forward diagonal scan direction, a forward horizontal scan direction, or a forward vertical scan direction. The scan direction can be a reversed version of the scans for non-common mode.

In some implementations, the common transform coefficient scan order type can correspond to a reverse transform coefficient scan order for encoding sign information regarding one or more transform coefficients.

In some implementations, each of the logical sub-units can include a plurality of regions, each region having a respective index value and a respective level value. Further, according to the common transform coefficient coding context scheme, a transform coefficient coding context for a particular region can be determined by identifying one or more other regions of the logical sub-unit having an index value less than an index value of that region, and determining the level values of each of the identified one or more other regions.

In some implementations, according to the common transform coefficient coding context scheme, the transform coefficient coding context for a particular region can be further determined by determining a sum of the level values of each of the identified one or more other regions, and selecting, based on the sum, the transform coefficient coding context for that region.

In some implementations, each of the logical sub-units can include a plurality of regions arranged according to a two-dimensional grid, each region having a respective level value. Further, According to the common transform coefficient coding context scheme, a transform coefficient coding context for a particular region can be determined by identifying one or more other regions of the logical sub-unit neighboring that region in the two-dimensional grid, and determining a sign of the level value of each of the identified one or more other regions.

In some implementations, according to the common transform coefficient coding context scheme, the transform coefficient coding context for a particular region can be further determined by selecting, based on the signs, the transform coefficient coding context for that region.

In some implementations, identifying the one or more other regions of the logical sub-unit neighboring that region in the two-dimensional grid can include identifying a first region to a right of that region in the two-dimensional grid, and identifying a second region below that region in the two-dimensional grid.

In some implementations, each of the logical sub-units can include a plurality of regions arranged according to a two-dimensional grid, each region having a respective level value. Further, according to the common transform coefficient coding context scheme, a transform coefficient coding context for a particular region can be determined by identifying one or more other regions of the logical sub-unit neighboring that region in the two-dimensional grid, and determining the level value of each of the identified one or more other regions.

In some implementations, according to the common transform coefficient coding context scheme, the transform coefficient coding context for a particular region can be further determined by selecting, based on the signs, the transform coefficient coding context for that region.

In some implementations, identifying the one or more other regions of the logical sub-unit neighboring that region in the two-dimensional grid can include identifying a first region above that region in the two-dimensional grid, and identifying a second region to a left of that region in the two-dimensional grid.

In some implementations, the first set of parameters can include a common intra-prediction mode associated with each of the logical sub-units of the first logical unit, a common inter-prediction mode associated with each of the logical sub-units of the first logical unit, and/or a common logical sub-unit size associated with each of the logical sub-units of the first logical unit.

In some implementations, the first set of parameters can specify that each of the logical sub-units of the first logical unit be decoded according to a Multiple Reference Line (MRL) prediction, a Palette Mode, a secondary transform, a Filter Intra Mode, or an Offset Based Refinement Intra Prediction (ORIP), or a Parity Hiding mode.

In some implementations, the secondary transform can be a Low-Frequency Non-Separable Transform.

In some implementations, the first set of parameters can include an angle delta value associated with each of the logical sub-units of the first logical unit.

In some implementations, the first set of parameters can specify that the data stream does not include last transform coefficient position signaling for any of the logical sub-units of the first logical unit.

In some implementations, the process 1100 can also include: determining that the data stream includes an indication of a first non-zero coefficient of one of the logical sub-units, and in response, (i) refraining from decoding coefficients of that logical sub-unit prior to the first non-zero coefficient, and sequentially decoding coefficients of that logical sub-unit beginning with the first non-zero coefficient.

In some implementations, the indication of the first non-zero coefficient of one of the logical sub-units can include a beginning of block (BOB) syntax. The BOB syntax can be positioned prior to the coefficients of that logical sub-unit in the bitstream.

Figure 11B:
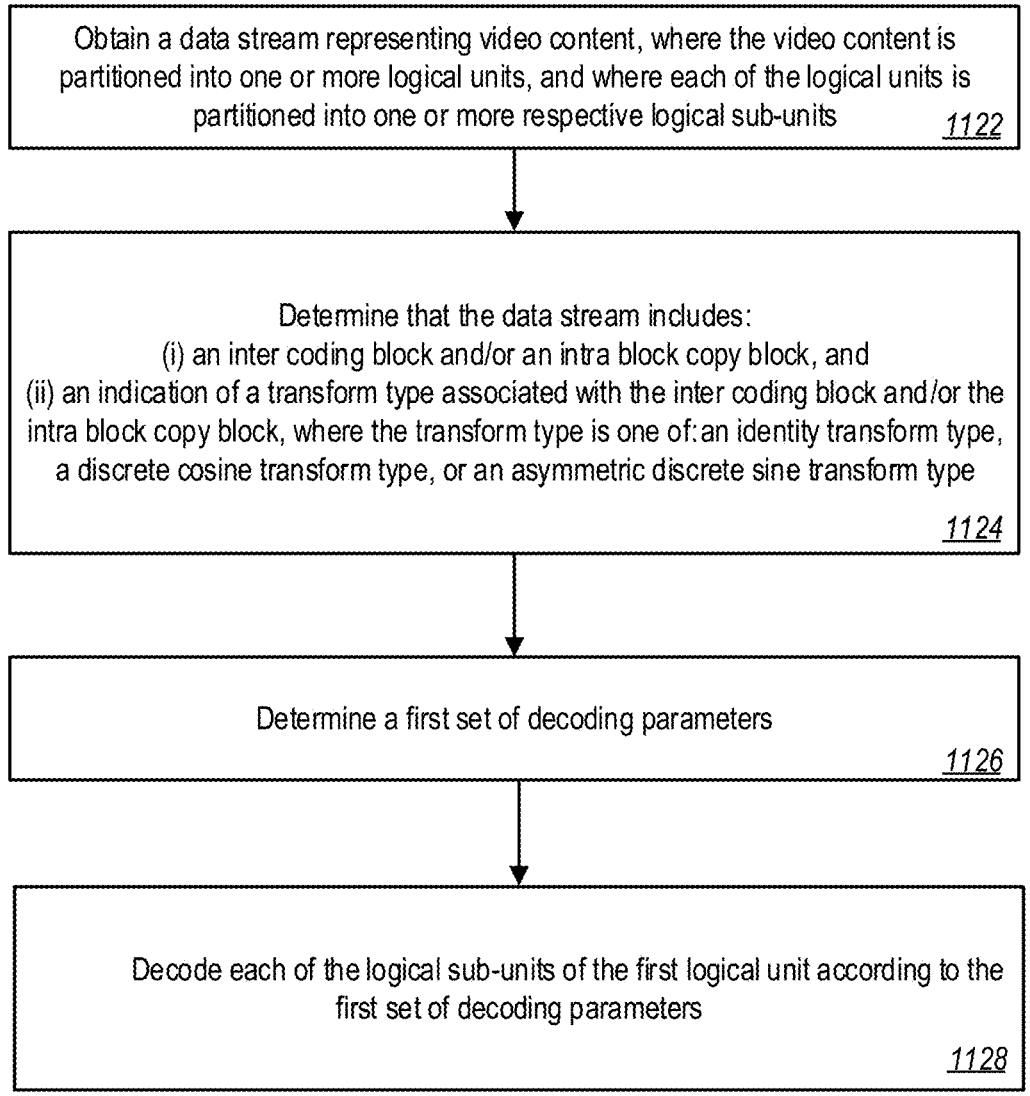

FIG. 11B shows another example process 1120 for processing a data stream representing video content. The process 1120 can be performed, at least in part, using a system having a decoder (e.g., as shown in FIGS. 1 and 2).

According to the process 1120, a decoder obtains a data stream representing video content (block 1122). The video content is partitioned into one or more logical units, and each of the logical units is partitioned into one or more respective logical sub-units.

The decoder determines that the data stream includes (i) an inter coding block and/or an intra block copy block, and (ii) an indication of a transform type associated with the inter coding block and/or the intra block copy block (block 1124). The transform type is one of: an identity transform type, a discrete cosine transform type, or an asymmetric discrete sine transform type.

In response to determining that the data stream includes the inter coding block and/or the intra block copy block and the indication of the transform type associated with the inter coding block and/or the intra block copy block, the decoder (i) determines a first set of decoding parameters (block 1126), and (ii) decodes each of the logical sub-units of the first logical unit according to the first set of decoding parameters (block 1128).

As an example, a decoder can infer that certain logical units and/or logical sub-units have been encoded according to a FSC mode, without requiring that the FSC mode be explicitly signaled for those logical units and/or logical sub-units in the bitstream. For instance, for inter-blocks and intra block copy (IBC) cases, the decoder can infer that data was encoded according to the FSC scheme based on the transform type signaled in the bitstream for a particular block (e.g., identity transform) and whether that block is an inter-block or IBC block.

Example Computer System

Figure 12:
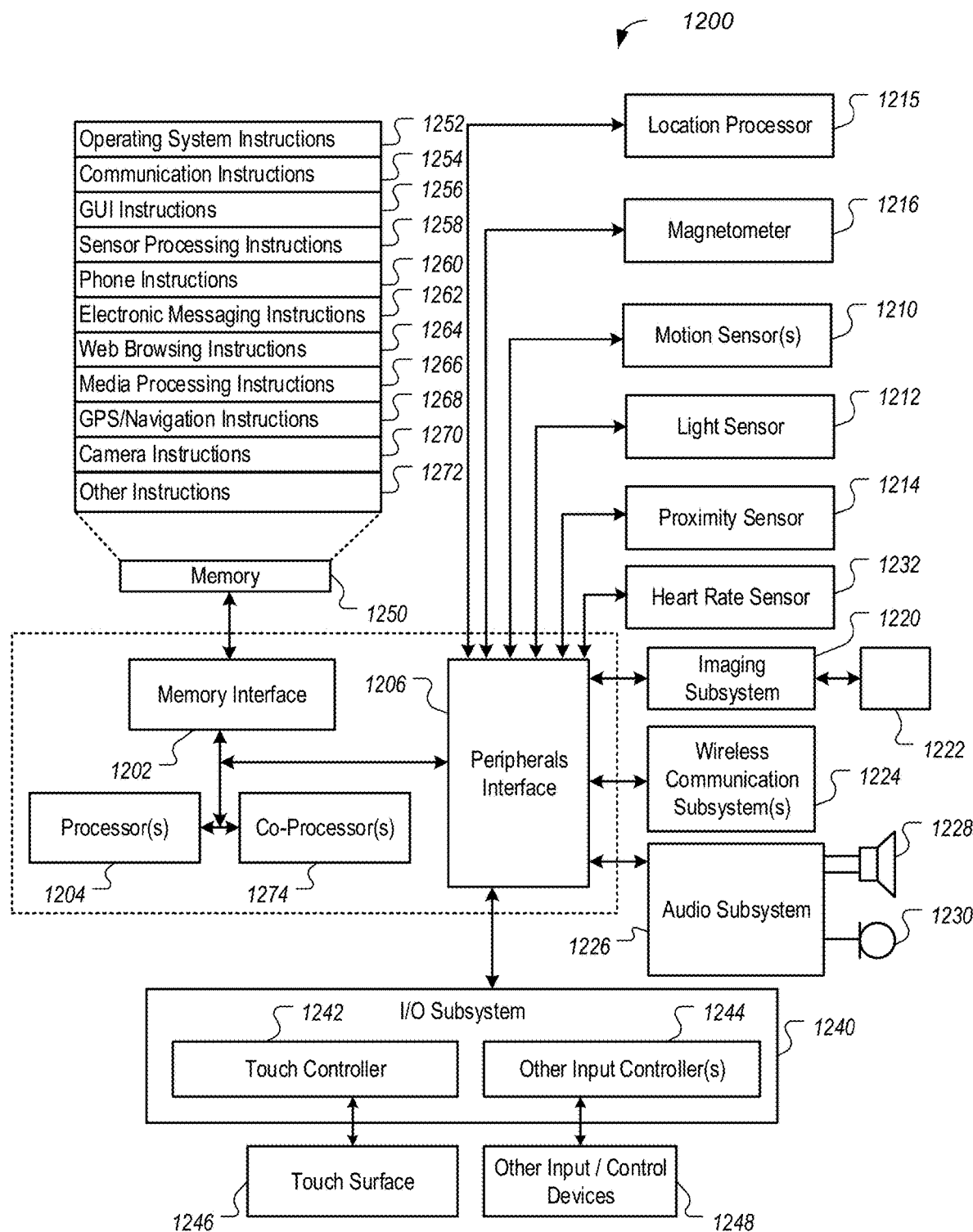
FIG. 12 is a diagram of an example device architecture for implementing the features and processes described in reference to FIGS. 1-11.

FIG. 12 is a block diagram of an example device architecture 1200 for implementing the features and processes described in reference to FIGS. 1-11. For example, the architecture 1200 can be used to implement the system 100 and/or one or more components of the system 100. The architecture 1200 may be implemented in any device for generating the features described in reference to FIGS. 1-11, including but not limited to desktop computers, server computers, portable computers, smart phones, tablet computers, game consoles, wearable computers, holographic displays, set top boxes, media players, smart TVs, and the like.

The architecture 1200 can include a memory interface 1202, one or more data processor 1204, one or more data co-processors 1274, and a peripherals interface 1206. The memory interface 1202, the processor(s) 1204, the co-processor(s) 1274, and/or the peripherals interface 1206 can be separate components or can be integrated in one or more integrated circuits. One or more communication buses or signal lines may couple the various components.

The processor(s) 1204 and/or the co-processor(s) 1274 can operate in conjunction to perform the operations described herein. For instance, the processor(s) 1204 can include one or more central processing units (CPUs) and/or graphics processing units (GPUs) that are configured to function as the primary computer processors for the architecture 1200. As an example, the processor(s) 1204 can be configured to perform generalized data processing tasks of the architecture 1200. Further, at least some of the data processing tasks can be offloaded to the co-processor(s) 1274. For example, specialized data processing tasks, such as processing motion data, processing image data, encrypting data, and/or performing certain types of arithmetic operations, can be offloaded to one or more specialized co-processor(s) 1274 for handling those tasks. In some cases, the processor(s) 1204 can be relatively more powerful than the co-processor(s) 1274 and/or can consume more power than the co-processor(s) 1274. This can be useful, for example, as it enables the processor(s) 1204 to handle generalized tasks quickly, while also offloading certain other tasks to co-processor(s) 1274 that may perform those tasks more efficiency and/or more effectively. In some cases, a co-processor(s) can include one or more sensors or other components (e.g., as described herein), and can be configured to process data obtained using those sensors or components, and provide the processed data to the processor(s) 1204 for further analysis.

Sensors, devices, and subsystems can be coupled to peripherals interface 1206 to facilitate multiple functionalities. For example, a motion sensor 1210, a light sensor 1212, and a proximity sensor 1214 can be coupled to the peripherals interface 1206 to facilitate orientation, lighting, and proximity functions of the architecture 1200. For example, in some implementations, a light sensor 1212 can be utilized to facilitate adjusting the brightness of a touch surface 1246. In some implementations, a motion sensor 1210 can be utilized to detect movement and orientation of the device. For example, the motion sensor 1210 can include one or more accelerometers (e.g., to measure the acceleration experienced by the motion sensor 1210 and/or the architecture 1200 over a period of time), and/or one or more compasses or gyros (e.g., to measure the orientation of the motion sensor 1210 and/or the mobile device). In some cases, the measurement information obtained by the motion sensor 1210 can be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 1210 can be directly integrated into a co-processor 1274 configured to processes measurements obtained by the motion sensor 1210. For example, a co-processor 1274 can include one more accelerometers, compasses, and/or gyroscopes, and can be configured to obtain sensor data from each of these sensors, process the sensor data, and transmit the processed data to the processor(s) 1204 for further analysis.

Other sensors may also be connected to the peripherals interface 1206, such as a temperature sensor, a biometric sensor, or other sensing device, to facilitate related functionalities. As an example, as shown in FIG. 12, the architecture 1200 can include a heart rate sensor 1232 that measures the beats of a user's heart. Similarly, these other sensors also can be directly integrated into one or more co-processor(s) 1274 configured to process measurements obtained from those sensors.

A location processor 1215 (e.g., a GNSS receiver chip) can be connected to the peripherals interface 1206 to provide geo-referencing. An electronic magnetometer 1216 (e.g., an integrated circuit chip) can also be connected to the peripherals interface 1206 to provide data that may be used to determine the direction of magnetic North. Thus, the electronic magnetometer 1216 can be used as an electronic compass.

An imaging subsystem 1220 and/or an optical sensor 1222 can be utilized to generate images, videos, point clouds, and/or other any other visual information regarding a subject or environment. As an example, the imaging subsystem 1220 can include one or more still cameras and/or optical sensors (e.g., a charged coupled device [CCD] or a complementary metal-oxide semiconductor [CMOS] optical sensor) configured to generate still images of a subject or environment. As another example, the imaging subsystem 1220 can include one or more video cameras and/or optical sensors configured to generate videos of a subject or environment. As another example, the imaging subsystem 1220 can include one or more depth sensors (e.g., LiDAR sensors) configured to generate a point cloud representing a subject or environment. In some implementations, at least some of the data generated the imaging subsystem 1220 and/or an optical sensor 1222 can include two-dimensional data (e.g., two-dimensional images, videos, and/or point clouds). In some implementations, at least some of the data generated the imaging subsystem 1220 and/or an optical sensor 1222 can include three-dimensional data (e.g., three-dimensional images, videos, and/or point clouds).

The information generated by the imaging subsystem 1220 and/or an optical sensor 1222 can be used to generate corresponding polygon meshes and/or to sample those polygon meshes (e.g., using the systems and/or techniques described herein). As an example, at least some of the techniques described herein can be performed at least in part using one or more data processors 1204 and/or one or more data co-processors 1274.

Communication functions may be facilitated through one or more communication subsystems 1224. The communication subsystem(s) 1224 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data.

The specific design and implementation of the communication subsystem 1224 can depend on the communication network(s) or medium(s) over which the architecture 1200 is intended to operate. For example, the architecture 1200 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 1200 can be configured as a base station for other wireless devices. As another example, the communication subsystems may allow the architecture 1200 to synchronize with a host device using one or more protocols, such as, for example, the TCP/IP protocol, HTTP protocol, UDP protocol, and any other known protocol.

An audio subsystem 1226 can be coupled to a speaker 1228 and one or more microphones 1230 to facilitate voice-enabled functions, such as voice recognition, voice replication, digital recording, and telephony functions.

An I/O subsystem 1240 can include a touch controller 1242 and/or other input controller(s) 1244. The touch controller 1242 can be coupled to a touch surface 1246. The touch surface 1246 and the touch controller 1242 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 1246. In one implementation, the touch surface 1246 can display virtual or soft buttons and a virtual keyboard, which can be used as an input/output device by the user.

Other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of the speaker 1228 and/or the microphone 1230.

In some implementations, the architecture 1200 can present recorded audio and/or video files, such as MP3, AAC, and MPEG video files. In some implementations, the architecture 1200 can include the functionality of an MP3 player and may include a pin connector for tethering to other devices. Other input/output and control devices may be used.

A memory interface 1202 can be coupled to a memory 1250. The memory 1250 can include high-speed random access memory or non-volatile memory, such as one or more magnetic disk storage devices, one or more optical storage devices, or flash memory (e.g., NAND, NOR). The memory 1250 can store an operating system 1252, such as MACOS, IOS, Darwin, RTXC, LINUX, UNIX, WINDOWS, or an embedded operating system such as VxWorks. The operating system 1252 can include instructions for handling basic system services and for performing hardware dependent tasks. In some implementations, the operating system 1252 can include a kernel (e.g., UNIX kernel).

The memory 1250 can also store communication instructions 1254 to facilitate communicating with one or more additional devices, one or more computers or servers, including peer-to-peer communications. The communication instructions 1254 can also be used to select an operational mode or communication medium for use by the device, based on a geographic location (obtained by the GPS/Navigation instructions 1268) of the device. The memory 1250 can include graphical user interface instructions 1256 to facilitate graphic user interface processing, including a touch model for interpreting touch inputs and gestures; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions; media processing instructions 1266 to facilitate media processing-related processes and functions; GPS/Navigation instructions 1269 to facilitate GPS and navigation-related processes; camera instructions 1270 to facilitate camera-related processes and functions; and other instructions 1272 for performing some or all of the processes described herein.

Each of the above identified instructions and applications can correspond to a set of instructions for performing one or more functions described herein. These instructions need not be implemented as separate software programs, procedures, or modules. The memory 1250 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of mesh and point cloud data available from various sources to improve services a mobile device can provide to a user. The present disclosure further contemplates that to the extent mesh and point cloud data representative of personal information data are collected, analyzed, disclosed, transferred, stored, or otherwise used, implementors will comply with well-established privacy policies and/or privacy practices. In particular, such implementers should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such implementers would take any needed steps for safeguarding and securing access to such personal information data and ensuring that others with access to the personal information data adhere to their privacy policies and procedures. Further, such implementers can subject themselves to evaluation by third parties to certify their adherence to widely accepted privacy policies and practices.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   obtaining, by a decoder, a data stream representing video content, wherein the video content is partitioned into one or more logical units, and wherein each of the logical units is partitioned into one or more respective logical sub-units;
   determining, by the decoder, that the data stream comprises a first syntax element indicating whether a first logical unit has been encoded according to a flexible skip coding scheme, wherein a first value of the first syntax element indicates that first logical unit has been encoded according to the flexible skip coding scheme, and wherein a second value of the first syntax element indicates that first logical unit has not been encoded according to the flexible skip coding scheme; and
   responsive to determining that the data stream comprises the first syntax element and that the first syntax element has the first value indicating that the first logical unit has been encoded according to the flexible skip coding scheme:
      determining, based on the first syntax element, that a first set of decoding parameters are not explicitly signaled in the data stream, wherein the first set of parameters comprises at least one of:
         a common transform type associated with each of the logical sub-units of the first logical unit,
         a common transform coefficient scan order type associated with each of the logical sub-units of the first logical unit,
         a common transform coefficient scan direction associated with each of the logical sub-units of the first logical unit,
         a common transform coefficient coding context scheme associated with each of the logical sub-units of the first logical unit, or
         a common transform size associated with each of the logical sub-units of the first logical unit,
      inferring the first set of decoding parameters based on the first syntax element, and
      decoding each of the logical sub-units of the first logical unit according to the first set of decoding parameters.

2. The method of claim 1, further comprising:
   determining, by the decoder, that the data stream comprises a second syntax element indicating that a plurality of second logical units has been encoded according to the flexible skip coding scheme; and
   responsive to determining that the data stream comprises the second syntax element:
      inferring a second set of decoding parameters based on the second syntax element, and
      decoding each of the logical sub-units of the second logical unit according to the second set of decoding parameters.

3. The method of claim 1, wherein each of the one or more logical units is one or more of:
   a coding block of the video content,
   a macroblock of the video content
   a prediction unit of the video content,
   a coding-tree-unit of the video content,
   a super-block of the video content,
   a slice of the video content,
   a tile of the video content,
   a segment of the video content, or
   a picture of the video content.

4. The method of claim 3, wherein each of the one or more logical sub-units is a transform unit of the video content.

5. The method of claim 1, wherein the first syntax element indicates that one or more specified color components of the first logical unit have been encoded according to the flexible skip coding scheme, and
   wherein decoding each of the logical sub-units of the first logical unit according to the first set of decoding parameters comprises:
      decoding the one or more specified color components of the logical sub-units of the first logical unit according to the first set of decoding parameters.

6. The method of claim 5, wherein the one or more specified color components comprises at least one of:
   a luma component, or
   a chroma component.

7. The method of claim 1, wherein the common transform type is one or more of:
   an identity transform type,
      a discrete cosine transform type, or
      an asymmetric discrete sine transform type, or
      a learned transform type.

8. The method of claim 1, wherein the common transform coefficient scan order type corresponds to a forward transform coefficient scan order for encoding level information regarding one or more transform coefficients.

9. The method of claim 8, wherein the common transform coefficient scan direction is one of:
   a forward up-right diagonal scan,
   a forward down-right diagonal scan,
   a forward zig-zag scan direction,
   a forward diagonal scan direction,
   a forward horizontal scan direction, or
   a forward vertical scan direction.

10. The method of claim 1, wherein the common transform coefficient scan order type corresponds to a reverse transform coefficient scan order for encoding sign information regarding one or more transform coefficients.

11. The method of claim 1, wherein each of the logical sub-units comprises a plurality of regions, each region having a respective index value and a respective level value, and
   wherein according to the common transform coefficient coding context scheme, a transform coefficient coding context for a particular region is determined by:
      identifying one or more other regions of the logical sub-unit having an index value less than an index value of that region, and
      determining the level values of each of the identified one or more other regions.

12. The method of claim 11, wherein according to the common transform coefficient coding context scheme, the transform coefficient coding context for a particular region is further determined by:
   determining a sum of the level values of each of the identified one or more other regions, and
   selecting, based on the sum, the transform coefficient coding context for that region.

13. The method of claim 1, wherein each of the logical sub-units comprises a plurality of regions arranged according to a two-dimensional grid, each region having a respective level value, and
   wherein according to the common transform coefficient coding context scheme, a transform coefficient coding context for a particular region is determined by:

identifying one or more other regions of the logical sub-unit neighboring that region in the two-dimensional grid, and determining a sign of the level value of each of the identified one or more other regions.

14. The method of claim 13, wherein according to the common transform coefficient coding context scheme, the transform coefficient coding context for a particular region is further determined by:

selecting, based on the signs, the transform coefficient coding context for that region.

15. The method of claim 13, wherein identifying the one or more other regions of the logical sub-unit neighboring that region in the two-dimensional grid comprises:

identifying a first region to a right of that region in the two-dimensional grid, and identifying a second region below that region in the two-dimensional grid.

16. The method of claim 1, wherein each of the logical sub-units comprises a plurality of regions arranged according to a two-dimensional grid, each region having a respective level value, and wherein according to the common transform coefficient coding context scheme, a transform coefficient coding context for a particular region is determined by: identifying one or more other regions of the logical sub-unit neighboring that region in the two-dimensional grid, and determining the level value of each of the identified one or more other regions.

17. The method of claim 16, wherein according to the common transform coefficient coding context scheme, the transform coefficient coding context for a particular region is further determined by:

selecting, based on the signs, the transform coefficient coding context for that region.

18. The method of claim 16, wherein identifying the one or more other regions of the logical sub-unit neighboring that region in the two-dimensional grid comprises:

identifying a first region above that region in the two-dimensional grid, and identifying a second region to a left of that region in the two-dimensional grid.

19. The method of claim 1, wherein the first set of parameters comprises at least one of:

a common intra-prediction mode associated with each of the logical sub-units of the first logical unit, a common inter-prediction mode associated with each of the logical sub-units of the first logical unit, or a common logical sub-unit size associated with each of the logical sub-units of the first logical unit.

20. The method of claim 1, wherein the first set of parameters specifies that each of the logical sub-units of the first logical unit be decoded according to:

a Multiple Reference Line (MRL) prediction, a Palette Mode, a secondary transform, a Filter Intra Mode, an Offset Based Refinement Intra Prediction (ORIP), or a Parity Hiding mode.

21. The method of claim 20, wherein the secondary transform is a Low-Frequency Non-Separable Transform.

22. The method of claim 1, wherein the first set of parameters comprises:

an angle delta value associated with each of the logical sub-units of the first logical unit.

23. The method of claim 1, wherein the first set of parameters specifies that the data stream does not include last transform coefficient position signaling for any of the logical sub-units of the first logical unit.

24. The method of claim 1, further comprising:

determining that the data stream comprises an indication of a first non-zero coefficient of one of the logical sub-units; and responsive to determining that the data stream comprises the indication of the first non-zero coefficient of one of the logical sub-units:

refraining from decoding coefficients of that logical sub-unit prior to the first non-zero coefficient, and sequentially decoding coefficients of that logical sub-unit beginning with the first non-zero coefficient.

25. The method of claim 24, wherein the indication of the first non-zero coefficient of one of the logical sub-units comprises a beginning of block syntax, wherein the beginning of block syntax is positioned prior to the coefficients of that logical sub-unit in the data stream.

26. A system comprising:

one or more processors; and memory storing instructions that when executed by the one or more processors, cause the one or more processors to perform the method of claim 1.

27. One or more non-transitory computer-readable media storing instructions that when executed by one or more processors, cause the one or more processors to perform the method of claim 1.

* * * * *